US005473702A

United States Patent [19]

Yoshida et al.

[11] Patent Number: 5,473,702

[45] Date of Patent: Dec. 5, 1995

[54] ADAPTIVE NOISE CANCELLER

[75] Inventors: Tatsumasa Yoshida; Ryoichi Miyamoto; Masashi Takada; Katsuya Suzuki, all of Tokyo, Japan

[73] Assignee: Oki Electric Industry Co., Ltd., Tokyo, Japan

[21] Appl. No.: 70,233

[22] Filed: Jun. 2, 1993

[30] Foreign Application Priority Data

| | | | |
|---|---|---|---|
| Jun. 3, 1992 | [JP] | Japan | 4-142632 |
| Apr. 12, 1993 | [JP] | Japan | 5-084311 |

[51] Int. Cl.$^6$ .................... H04B 15/00

[52] U.S. Cl. .................... 381/94; 381/71

[58] Field of Search .................... 381/71, 94, 92, 381/122, 93, 91

[56] References Cited

U.S. PATENT DOCUMENTS

| | | | |
|---|---|---|---|
| 4,672,674 | 6/1987 | Clough et al. | 381/71 |
| 5,192,918 | 3/1993 | Sugiyama | 381/71 |
| 5,243,661 | 9/1993 | Ohkubo et al. | 381/71 |

FOREIGN PATENT DOCUMENTS

| | | |
|---|---|---|
| 3925589A1 | 2/1991 | Germany . |
| 2095518A | 9/1982 | United Kingdom . |

*Primary Examiner*—Curtis Kuntz
*Assistant Examiner*—Huyen D. Le
*Attorney, Agent, or Firm*—Spencer, Frank & Schneider; Christopher H. Lynt

[57] ABSTRACT

An adaptive filter estimates the noise component in a primary audio signal by convolving a secondary audio signal with a set of coefficients. The estimated noise component is subtracted from the primary audio signal to produce an output signal. During steady-state operation, the adaptive filter coefficients are updated as to minimize the difference between the primary audio signal and the estimated noise component. Steady-state operation is identified automatically by monitoring the power level of the primary or secondary audio signal, or the power level of the output signal. Coefficient updating is suspended when the monitored power level rises from a steady state to an unsteady state, and is resumed when the monitored power level returns to its previous steady-state level, or settles into a new steady state.

27 Claims, 18 Drawing Sheets

ADAPTIVE NOISE CANCELLER

BACKGROUND OF THE INVENTION

This invention relates to an adaptive noise canceler for use in, for example, a hands-free automobile telephone.

Much research has recently been done on the removal of background noise such as engine noise from a voice signal picked up by the microphone of an automobile telephone. One method that has been proposed employs two microphones, one disposed close to the voice source and far from the noise source, the other disposed far from the voice source and close to the noise source. During an interval in which background noise is present but voice is absent, a switch is depressed, causing the input levels from the two microphones to be compared and their ratio to be set as a threshold value. When voice is present, an adaptive filter uses this threshold to remove the noise component.

A major problem in this method is that whenever the background noise level changes, the operator must depress the switch to establish a new threshold level. Changes in noise level occur frequently in the cabin of an automobile: the vehicle speed varies, the engine rpm rate varies, traffic conditions vary, windows are opened and closed, the air conditioner is switched on and off, and so on. Without some means of automatically adjusting to different noise levels, the method described above has little practical value.

Another problem is that it is difficult to set an appropriate threshold when the signal-to-noise ratio is low.

SUMMARY OF THE INVENTION

It is accordingly an object of the present invention to enable a noise canceler to adapt automatically to changes in background noise level.

Another object of the invention is to cancel background noise accurately even when the signal-to-noise ratio is low.

Still another object is to respond quickly to the presence or absence of voice input.

Yet another object is to disable noise canceling automatically when the background noise level is very low.

The invented adaptive noise canceler uses a secondary audio signal to cancel noise in a primary audio signal. The secondary audio signal is filtered according to a set of coefficients to generate an estimated noise signal, which is subtracted from the primary audio signal to generate an error signal. The error signal becomes an audio output signal.

By monitoring the power level of the primary audio signal, or the secondary audio signal, or the error signal, the adaptive noise canceler generates a control signal. While the control signal is inactive, the above-mentioned coefficients are updated according to the error signal, so as to minimize the error signal. When the control signal is active, the coefficients are held constant.

The control signal is made active when the monitored power level rises from a steady state to an unsteady state, and is made inactive when the power level returns to its previous steady state or settles into a new steady state. A rise from a steady state is recognized by comparing the power level with a threshold. The threshold is updated to follow gradual changes in the power level during the steady state, and is also updated when the power level settles from an unsteady state into a new steady state.

According to one aspect of the invention, the threshold is also updated to follow the power level when the power level falls from a steady state to a lower state.

According to another aspect of the invention, the control signal is made active if the power level of the primary or secondary audio signal falls below a certain fixed threshold, and the coefficients are initialized if the power level of the primary or secondary audio signal remains below this fixed threshold for a certain time.

DETAILED DESCRIPTION OF THE INVENTION

Three embodiments of the invention will be described with reference to the attached drawings. These drawings illustrate the invention but do not restrict its scope, which should be determined solely from the appended claims.

All signals will be shown as active high, and the terms "active" and "high" will be used interchangeably. Active high is of course not a restriction. The invention can be practiced with signals that are active low.

Numerical values of constants will be given as examples. The invention is not restricted to the given numerical values, but the given values do serve to indicate whether the constants should be greater than or less than unity.

Figure 1:
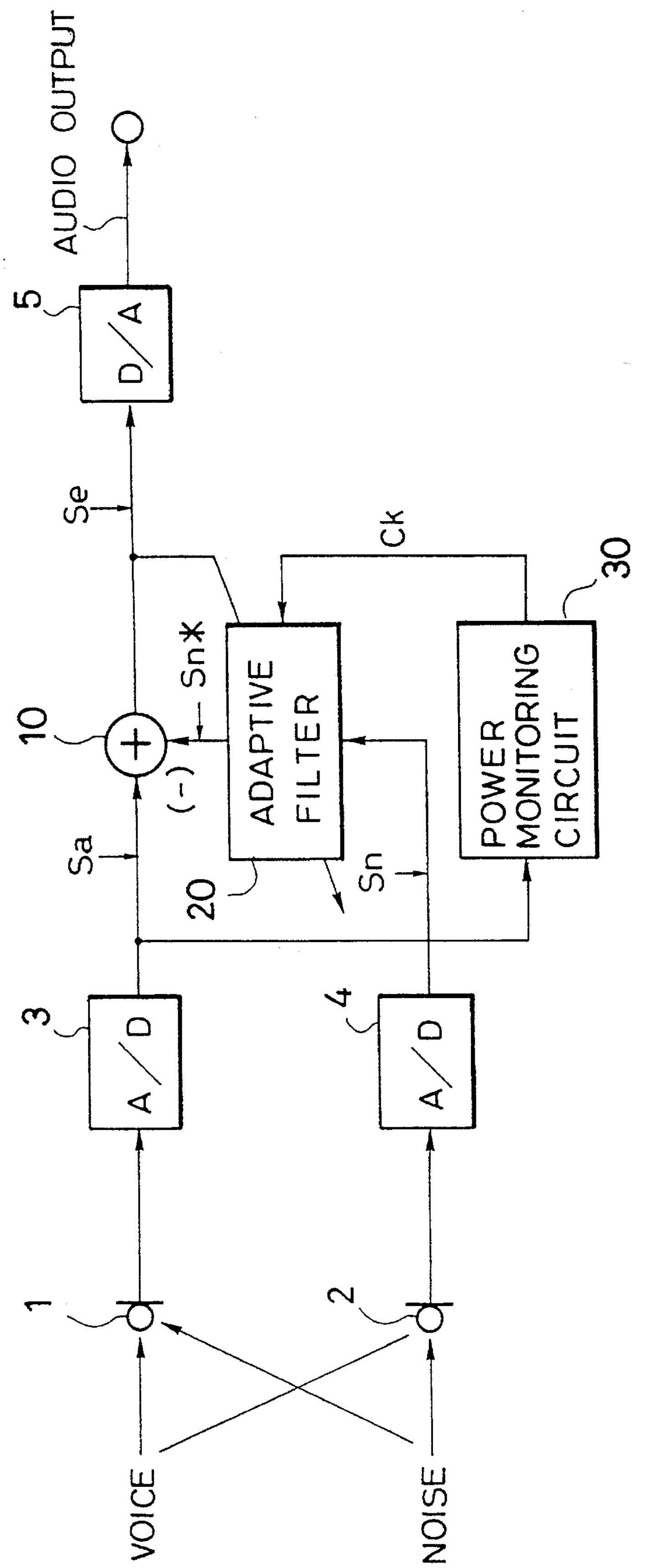
FIG. 1 is a block diagram of a first embodiment of the invention.

FIG. 1 illustrates a first embodiment of the invention, comprising a pair of microphones 1 and 2, a pair of A/D converters 3 and 4, a D/A converter 5, an adder 10, an adaptive filter 20, and a power monitoring circuit 30.

The microphone 1 is disposed relatively close to a voice source and picks up both voice input and background noise, which it sends to the A/D converter 3 as a primary audio signal. The A/D converter 3 samples this primary audio signal and converts each sample to a certain number of bits, thereby generating a primary digital input signal Sa.

The microphone 2 is disposed relatively far from the voice source and picks up mainly noise, which it sends to the A/D converter 4 as a secondary audio signal. The A/D converter 4 samples this secondary audio signal and converts each sample to a certain number of bits, thereby generating a secondary digital input signal Sn.

The primary digital input signal Sa is supplied to the adder 10, which subtracts from it an estimated noise signal Sn* described below to generate an error signal Se. The D/A converter 5 converts the error signal Se from digital to analog form to generate an audio output signal from which noise has been largely removed. (Adders will be described as performing subtraction operations throughout the following description. This means that the two's complement is taken of one of the inputs to the adder, as indicated by a minus sign in the drawings.)

The primary digital input signal Sa is also supplied to the power monitoring circuit 30, which monitors the power level of the primary digital input signal Sa and generates a control signal Ck responsive to changes in this power level. The control signal Ck is inactive when the power level of the primary digital input signal Sa is steady, and becomes active when the power level rises from a steady state.

The adaptive filter 20 receives the error signal Se, the secondary digital input signal Sn, and the control signal Ck and generates the estimated noise signal Sn*. The function of the adaptive filter 20 is to estimate, on the basis of the secondary digital input signal Sn, the noise component present in the primary digital input signal Sa, and duplicate this noise component with the estimated noise signal Sn*.

To produce the current value of the estimated noise signal Sn*, the adaptive filter 20 multiplies the current value of the secondary digital input signal Sn and a certain number of previous values of the secondary digital input signal Sn by a set of coefficients, then adds the resulting products. Next, if the control signal Ck is inactive, the adaptive filter 20 updates the coefficients on the basis of the current value of the error signal Se and a certain number of previous values of the error signal Se. If the control signal Ck is active, the adaptive filter 20 does not update the coefficients.

In updating the coefficients, the adaptive filter 20 employs an algorithm that attempts to minimize the error signal Se. More specifically, the adaptive filter 20 estimates a transfer function that equalizes the primary digital input signal Sa and the secondary digital input signal Sn and convolves this transfer function with the secondary digital input signal Sn to generate the estimated noise signal Sn*. The transfer function can be estimated as a finite or infinite impulse response (FIR or IIR), or in other ways. A detailed description of the adaptive filter 20 will be omitted, because adaptive filters are well known.

Figure 2:
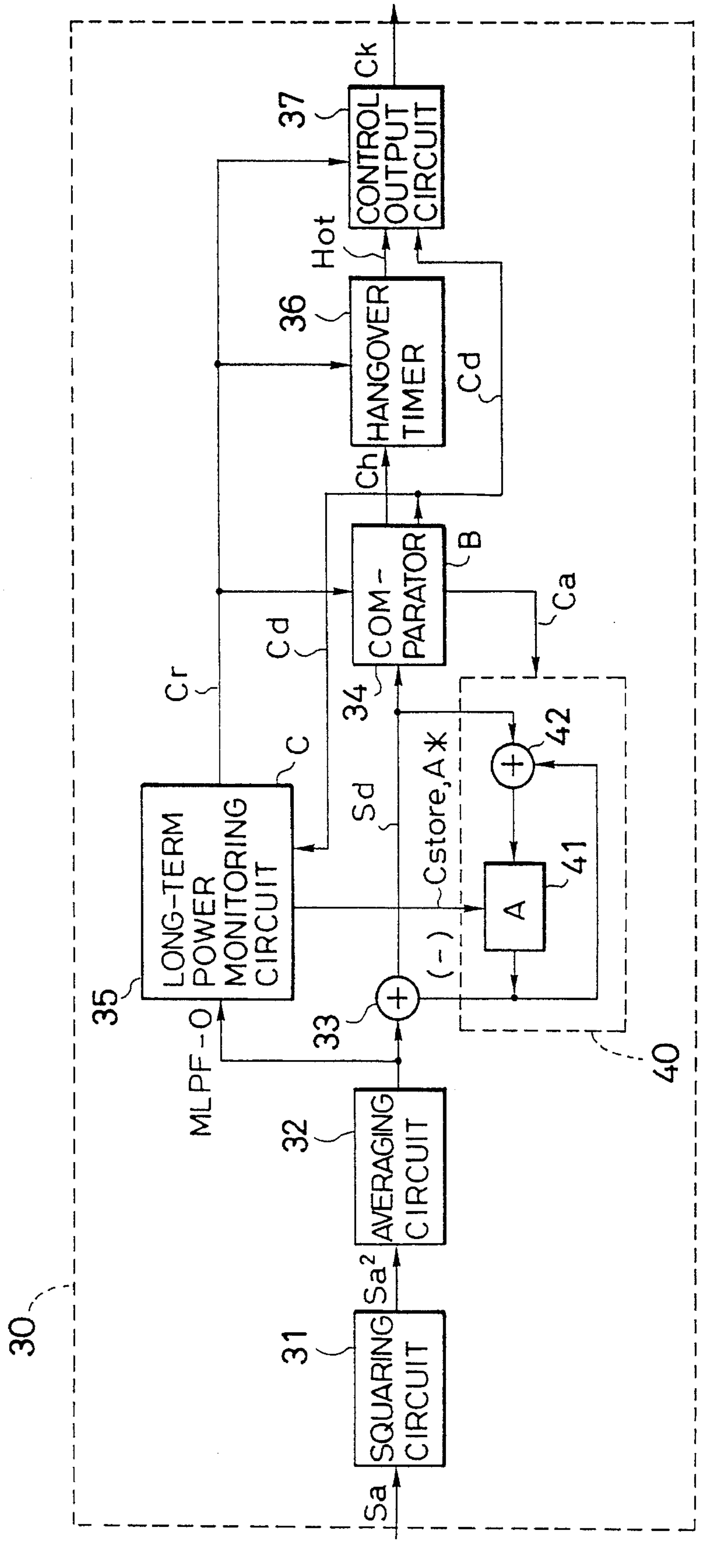
FIG. 2 is a more detailed block diagram of the power monitoring circuit in FIG. 1.

Next the power monitoring circuit 30 will be described in more detail. Referring to FIG. 2, the power monitoring circuit 30 comprises a squaring circuit 31, an averaging circuit 32, an adder 33, a comparator 34, a long-term power monitoring circuit 35, a hangover timer 36, a control output circuit 37, and an adaptive threshold circuit 40. The adaptive threshold circuit 40 comprises a register 41 and a adder 42.

The squaring circuit 31 receives the primary digital input signal Sa and raises it to the second power to generate a squared input signal $Sa^2$.

The averaging circuit 32 averages the squared input signal $Sa^2$ over intervals of a certain length to generate a primary power signal MLPF-0. The averaging circuit 32 acts as a simple low-pass filter, smoothing out sample-to-sample variations in the squared input signal $Sa^2$.

The adder 33 subtracts an adaptive threshold A from the primary power signal MLPF-0 to generate a difference signal Sd. The adaptive threshold A is output from the adaptive threshold circuit 40 as described below.

The comparator 34 compares the level of the difference signal Sd with a fixed threshold B and generates two output signals: an adder disable signal Ca and a detection signal Cd. These two signals are both inactive (low) if the difference signal Sd is less than the fixed threshold B, and both active (high) if the difference signal Sd exceeds the fixed threshold value B. The comparator 34 also generates a hangover signal Ch. This is a pulse signal that goes high for a brief interval at each high-to-low transition of the detection signal Cd. A pulse of the hangover signal Ch therefore occurs whenever the difference signal Sd decreases from a value above the fixed threshold B to a value below fixed threshold B.

The long-term power monitoring circuit 35 receives the primary power signal MLPF-0 and the detection signal Cd and generates three output signals: a long-term average signal A*, a store signal Cstore, and a reset signal Cr. The long-term average signal A* is generated by performing a further averaging process on the primary power signal MLPF-0 extending over an interval with a duration of, for example, several hundred milliseconds. The store signal Cstore and reset signal Cr both become active when the detection signal Cd is active and variations in the long-term average signal A* have remained within a fixed steady-state margin C for a certain time T2. Cstore and Cr are both inactive when the detection signal Cd is inactive, or when the long-term average signal A* has not stayed within the steady-state margin C continuously for time T2.

The hangover timer 36 receives the hangover signal Ch and generates a hangover timing signal Hot. The hangover timing signal Hot is normally inactive, but when the hangover signal Ch goes high, the hangover timer 36 responds by making the hangover timing signal Hot active for a duration T1 of, for example, several milliseconds or several tens of milliseconds.

The control output circuit 37 receives the detection signal Cd and hangover timing signal Hot, and generates the control signal Ck. The control signal Ck becomes active, disabling the updating of coefficients in the adaptive filter 20, whenever the detection signal Cd or hangover timing signal Hot is active. When the detection signal Cd and hangover timing signal Hot are both inactive, the control signal Ck also becomes inactive, enabling the updating of coefficients in the adaptive filter 20.

The comparator 34, the hangover timer 36, and the control output circuit 37 also receive the reset signal Cr output by the long-term power monitoring circuit 35. When the reset signal Cr goes high, the comparator 34, hangover timer 36, and control output circuit 37 are immediately reset, deactivating the adder disable signal Ca, the detection signal Cd, the hangover timing signal Hot, and the control signal Ck.

The adaptive threshold circuit 40 receives the difference signal Sd from the adder 33, the adder disable signal Ca from the comparator 34, and the long-term average signal A* and store signal Cstore from the long-term power monitoring circuit 35. When the adder disable signal Ca is inactive, the adder 42 adds the difference signal Sd to the adaptive threshold value A output by the adaptive threshold circuit 40 and places their sum in the register 41. The value stored in the register 41 is output as a new adaptive threshold A from the adaptive threshold circuit 40. When the adder disable signal Ca is active, this addition operation is not performed, leaving the adaptive threshold A unchanged. When the adder disable signal Ca is active and the store signal Cstore is also active, however, the register 41 stores the value of the long-term average signal A* as a new threshold value A*.

When the adder disable signal Ca is inactive, the values of the primary power signal MLPF-0 (=$Sa^2a$), difference signal Sd, and adaptive threshold A at the current sample and the previous sample are related as follows:

Previous Sd=previous MLPF-0–previous A

Current A=previous A+previous Sd=previous MLPF-0

Current Sd=current MLPF-0–current A

Current Sd=current MLPF-0–previous MLPF-0

The power monitoring circuit 30 can be implemented with digital electronic circuits specially designed to carry out the necessary arithmetic and other operations, these circuits forming, for example, modules in an application-specific large-scale integrated circuit. Methods of designing such integrated circuits are well known, so a detailed description will be omitted. Those skilled in the art will also appreciate that the power monitoring circuit 30 can be implemented by programming a digital signal processor, microprocessor, or other type of processor to carry out the necessary operations.

The operation of the power monitoring circuit 30 will next be explained with reference to FIG. 3, which shows waveforms of the signals described above.

Initially, the primary power signal MLPF-0 is rising at a steady, gradual rate, as indicated by the portion of the waveform labeled APO. This type of rise is not indicative of the presence of voice input. During this time, the difference signal Sd is equal to the difference between successive values of the primary power signal MLPF-0, as was shown by the equations above, so Sd has a substantially constant value (BPO) which is less than the fixed threshold B. Accordingly, the other signals shown in FIG. 3 all remain low. In particular, the control signal Ck remains low (HPO), enabling the updating of coefficients in the adaptive filter 20, and the adder disable signal Ca remains low, enabling the adaptive threshold A to be updated. This updating of the adaptive threshold A is one of the novel features of the first embodiment, enabling the noise canceler to adapt automatically to gradually-rising background noise.

At the point marked AP1 the primary power signal MLPF-0 increases abruptly to a higher but unsteady state. The difference signal Sd also rises abruptly at BP1, exceeding the threshold value B. This causes the adder disable signal Ca and the detection signal Cd go high (CP1 and DP1). Since the adder disable signal Ca is high, the adaptive threshold circuit 40 stops updating its output value A, so the difference signal Sd continues to be equal to the difference between the current value of the primary power signal MLPF-0 and the value of the primary power signal MLPF-0 just before the abrupt rise at AP1. As long as this difference exceeds the threshold value B, the adder disable signal Ca and the detection signal Cd remain high. Since the detection signal Cd is high, the control signal Ck goes high, disabling the updating of coefficients in the adaptive filter 20.

After a while the primary power signal MLPF-0 returns to its value previous to AP1 and holds steady at this value, as indicated by the waveform segment labeled AP2. The difference signal Sd accordingly falls to a value BP2 of zero. When the difference signal Sd falls below the threshold value B, the adder disable signal Ca and the detection signal Cd go low (CP2 and DP2). The high-to-low transition of the detection signal Cd generates a high pulse (EP2) of the hangover signal Ch, which in turn triggers the hangover timing signal Hot (FP2). During the interval of duration T1 in which the hangover timing signal Hot is high, the control signal Ck remains high, continuing to disable the updating of coefficients in the adaptive filter 20. Coefficient updating is thus disabled throughout the interval labeled HP1.

After the duration T1, the hangover timing signal Hot goes low (FP3). Since the detection signal Cd is also low, the control signal Ck goes low (HP3), and updating of the filter coefficients resumes.

Next the primary power signal MLPF-0 increases abruptly again as AP4, this time climbing to a new, higher steady state. As before, the abrupt rise of the primary power signal MLPF-0 causes the difference signal Sd to rise to a value BP4 exceeding the threshold value B. The adder disable signal Ca, the detection signal Cd, and the control signal Ck therefore go high (CP4, DP4 and HP4), preventing the adaptive threshold circuit 40 from updating the value of A and preventing the adaptive filter 20 from updating its coefficient values.

When the primary power signal MLPF-0 rises at AP4, although not indicated in the drawing, the long-term average signal A* computed by the long-term power monitoring circuit 35 also begins to rise. The change in A* at first exceeds the steady-state margin C, but at time AP5, when the change in A* has stayed within the steady-state margin C for at least time T2, the long-term power monitoring circuit 35 drives the reset signal Cr and store signal Cstore high. The high reset signal Cr (GP5) resets the adder disable signal Ca, the detection signal Cd, and the control signal Ck, which all now go low (CP5, DP5 and HP5). The high store signal Cstore (IP5) causes the register 41 in the adaptive threshold circuit 40 to store the current value of the long-term average signal A* as a new adaptive threshold. Since A* is substantially equal to the current value of the primary power signal MLPF-0, the difference signal Sd immediately falls below the threshold value B, so the adder disable signal Ca and detection signal Cd remain low.

When the detection signal Cd goes low, the reset signal Cr and store signal Cstore also go low. This is why the reset signal Cr and store signal Cstore have the form of narrow pulses at GP5 and IP5.

Figure 3:
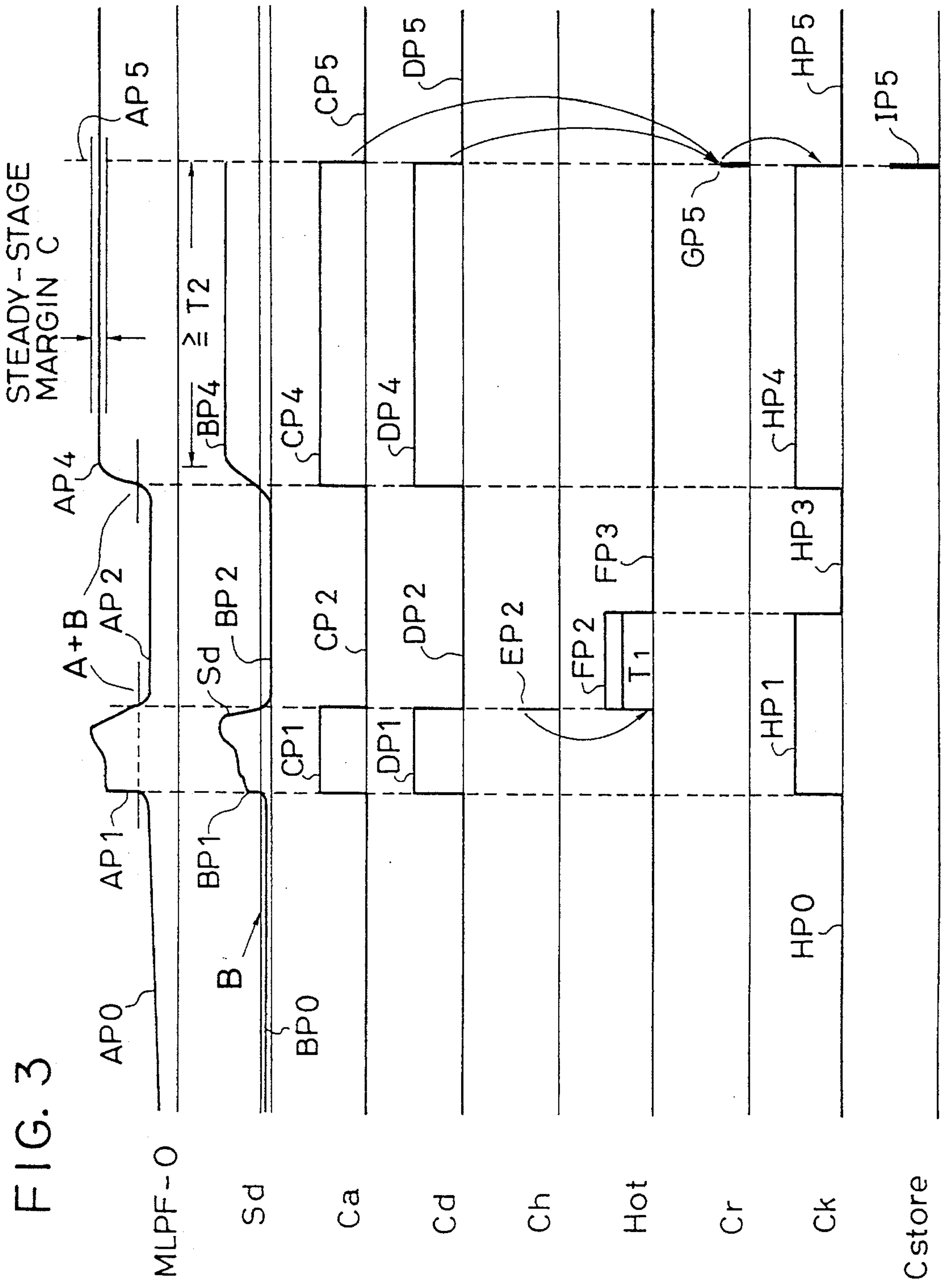
FIG. 3 is a timing diagram illustrating the operation of the power monitoring circuit in FIG. 2.

FIG. 3 has illustrated the case in which the noise power level rises from a steady-state level to a higher level, either an unsteady higher level or a new steady-state level. The case in which the noise power level falls from a steady-state level to a lower level is simpler. Since the difference signal Sd is below the threshold level B, the adder disable signal Ca and detection signal Cd remain low, so the output A of the adaptive threshold circuit 40 is updated and the coefficients in the adaptive filter 20 are also updated.

Since the difference signal Sd is equal to the primary power signal MLPF-0 minus the adaptive threshold A, comparing the difference signal Sd with B is equivalent to comparing the primary power signal MLPF-0 with A+B.

This leads to the following description of the operation of the power monitoring circuit 30.

Each new value of the primary power signal MLPF-0 is compared with a threshold A+B. If the primary power signal MLPF-0 is below the threshold A+B, the threshold A+B is updated to a new value equal to MLPF-0+B, and the control signal Ck, if inactive, is left inactive. If MLPF-0 is greater than the threshold A+B, the threshold A+B is not updated and the control signal Ck, if not already active, is made active.

Once made active, the control signal Ck remains active until at least one of two conditions is satisfied. The first condition is that the primary power signal MLPF-0 return to a value below the threshold A+B and remain below the threshold A+B for an interval of duration T1. During this interval of duration T1, the threshold A+B is updated as described above. The second condition is that the primary power signal MLPF-0 settle into a steady state higher than the threshold A+B and remain there for an interval of duration T2. At the end of this interval of duration T2, the threshold A+B is updated to MLPF-0+B, reflecting the new steady-state value.

When employed in a hands-free telephone in an automobile, the first embodiment operates generally as follows.

While the operator is not speaking, the adaptive filter 20 adapts to steady-state background noise such as engine noise in such a way as to minimize the error signal Se, therefore to minimize the audio output signal. That is, the noise canceler removes steady-state background noise from the audio output signal, which is its purpose.

If the background noise level decreases to a lower steady-state level (e.g. when the engine is switched off), the adaptive filter 20 immediately adapts to this change. Adaptation is also immediate when the noise level rises gradually. If the noise level increases quickly to a higher steady-state level, the adaptive filter 20 adapts to this change after a delay of length T2. These adaptations are performed automatically, without requiring the operator to press a switch.

When the noise level increases but the noise source remains the same (e.g. when the accelerator is depressed and engine noise increases), little or no adaptation of filter coefficients is needed to cancel the noise, because the transfer function remains substantially the same. Therefore, even during the above delay of length T2, the existing filter coefficients enable the noise canceler to cancel most or all of the noise. It is only a new source of noise (e.g., when the air conditioner is switched on) that is not canceled during the delay of length T2.

When the operator is speaking, the power level of the primary audio signal increases over the background noise level but does not reach a steady state, because speech is highly modulated. Accordingly, the noise canceler stops adapting, and continues to cancel background noise from existing sources without attempting to cancel the operator's voice. If a new source of background noise is introduced while the operator is speaking, the noise canceler adapts to this noise source during the pauses that occur frequently in normal speech.

Next a second embodiment will be described with reference to FIGS. 4 to 12. This embodiment differs from the first in that it enables or disables coefficient updating by monitoring the power level or the error signal Se instead of the primary digital input signal Sa. This method is particularly advantageous in noisy environments.

Figure 4:
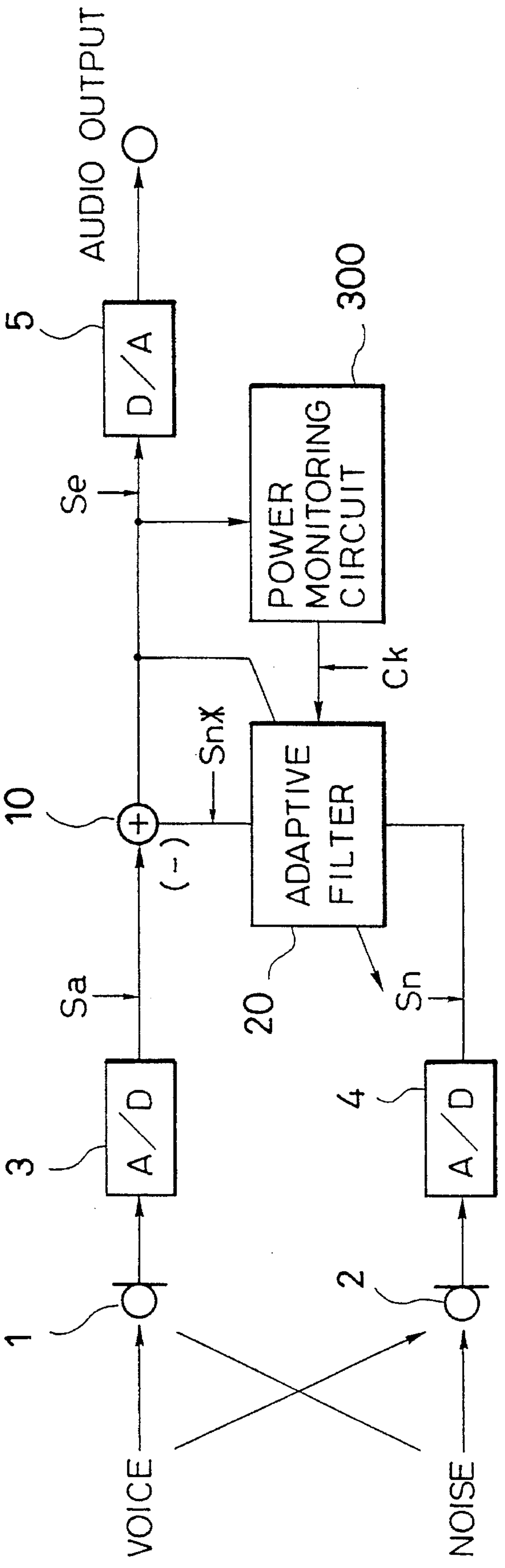
FIG. 4 is a block diagram of a second embodiment of the invention.

Referring to FIG. 4, the second embodiment employs the same microphones 1 and 2, A/D converters 3 and 4, D/A converter 5, adder 10, and adaptive filter 20 as the first embodiment. In place of the power monitoring circuit 30 of the first embodiment, however, the second embodiment has a power monitoring circuit 300 that receives the error signal Se from the adder 10. As before, the power monitoring circuit 300 generates a control signal Ck that, when active, prevents the adaptive filter 20 from updating its coefficients.

The power monitoring circuit 300 monitors the power level of the error signal Se, makes the control signal Ck inactive when the power level is in a steady state, and make the control signal Ck active when the power level increases above such a state. Next the internal structure and operation of the power monitoring circuit 300 will be described in more detail.

Figure 5:
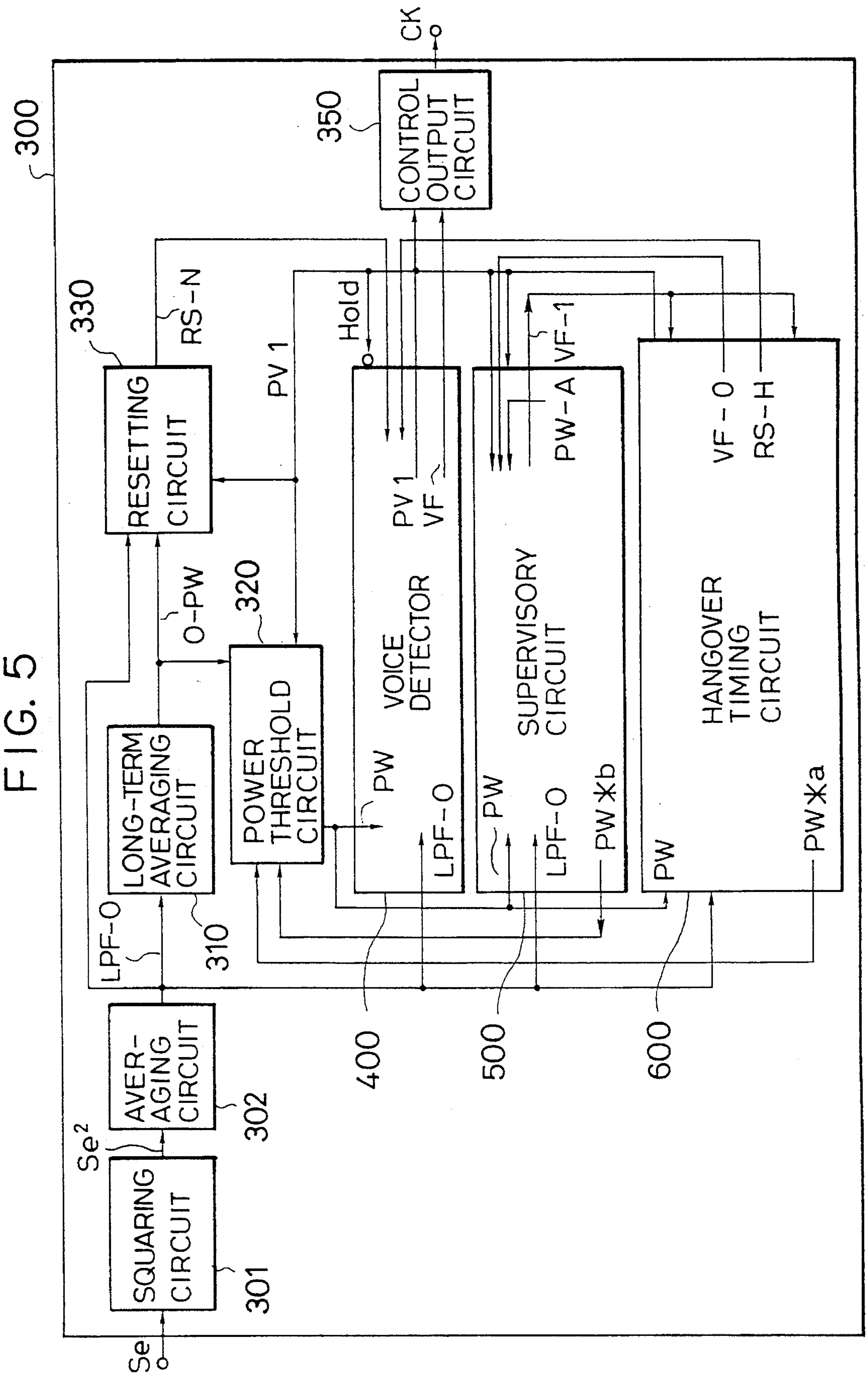
FIG. 5 is a more detailed block diagram of the power monitoring circuit in FIG. 4.

FIG. 5 is a block diagram of the power monitoring circuit 300, which comprises a squaring circuit 301, an averaging circuit 302, a long-term averaging circuit 310, a power threshold circuit 320, a voice detector 400, a supervisory circuit 500, a hangover timing circuit 600, a power threshold circuit 320, a resetting circuit 330, and a control output circuit 350.

The squaring circuit 301 receives the error signal Se and raises it to the second power to generate an error signal $Se^2$. The averaging circuit 302 averages the error signal $Se^2$ over intervals of a certain length to generate a power signal LPF-0.

The long-term averaging circuit 310 stores the power signal LPF-0 for a certain length of time and calculates the average value of part of the stored power signal LPF-0 to generate an average power signal O-PW.

The power threshold circuit 320 receives the average power signal O-PW from the long-term averaging circuit 310, as well as a voice detect signal PV1 indicating the presence of voice from the voice detector 400, and new power thresholds PW*a and PW*b from the hangover timing circuit 600 and the supervisory circuit 500. When voice is not detected, the power threshold circuit 320 multiplies the average power signal O-PW by a constant $\alpha$ (with a value of 1.4, for example) and supplies the product as a power threshold PW to the voice detector 400, the supervisory circuit 500, and the hangover timing circuit 600. When voice is detected the power threshold PW is held constant, except that if the supervisory circuit 500 generates a new power threshold PW*b or the hangover timing circuit 600 generates a new new power threshold PW*a, the power threshold PW is updated to the new value. This updating of the power threshold PW during the time while speech is detected is one of the novel features of the second embodiment.

When activated by a voice detect signal PV1, the resetting circuit 330 multiplies the average power signal O-PW by two constants "g" and "h" (with values of 2.0 and 0.5, for example) and compares the two products with the power signal LPF-0. If the power signal LPF-0 remains between these two products for a certain length of time (with the above values, if the power signal LPF-0 does not differ from the average power signal O-PW by more than a factor of two for a certain length of time), the error signal Se is deemed to be in a steady state, and the resetting circuit 330 activates a steady-state reset signal RS-N, which resets the voice detector 400.

The control output circuit 350 generates the control signal Ck, which is active when speech is detected, and also at other times whenever the power signal LPF-0 is greater than the power threshold PW. Specifically, the control output circuit 350 monitors two signals output by the voice detector 400: the voice detect signal PV1, which is active during voice detection intervals; and a voice count VF, which is greater than zero whenever the power signal LPF-0 exceeds the power threshold PW. The control signal Ck is active whenever the voice detect signal PV1 is active or the voice count VF is greater than zero. The control signal Ck is inactive when the voice detect signal PV1 is inactive and the voice count VF equals zero.

The voice detector 400 generates the voice count VF by counting up from zero during intervals in which the power signal LPF-0 exceeds the power threshold PW continuously. If the power signal LPF-0 exceeds the power threshold PW continuously for a certain length of time, this is interpreted as indicating the presence of voice and the voice detect signal PV1 is made active. After activating the voice detect signal PV1, the voice detector 400 suspends further operation and waits to be reset. A high voice detect signal PV1 also switches the mode of operation of the power threshold circuit 320 as described above, and activates the resetting circuit 330, supervisory circuit 500, and hangover timing circuit 600.

The supervisory circuit 500 monitors increases and decreases in the power signal LPF-0 by comparing the power signal LPF-0 with the power threshold PW multiplied by two constants β and "a," and generates two output signals: a falling-power count VF-1 and the new power threshold PW*b mentioned above. The falling-power count VF-1 indicates the amount of time and power signal LPF-0 is equal to or less than the power threshold PW multiplied β. The supervisory circuit 500 generates the falling-power count VF-1 by counting down to zero from an initial value set when the supervisory circuit 500 is activated by the voice detect signal PV1, or when the power signal LPF-0 exceeds the power threshold PW multiplied by another constant γ. (The values of β and γ are, for example, 1.25 and 1.5, respectively.)

If the power signal LPF-0 exceeds the product of the power threshold PW and "a" continuously for a certain continuous length of time, the increase in the power signal LPF-0 is deemed great enough to warrant an upward adjustment of the power threshold PW. (The value of "a" is, for example, 4.0.) The supervisory circuit 500 then multiplies the power threshold PW by a constant "c" (with a value of 1.2, for example) and provides the resulting new power threshold PW*b to the power threshold circuit 320.

The hangover timing circuit 600 receives the voice detect signal PV1, the power signal LPF-0, the power threshold PW, and the falling-power count VF-1. After the falling-power count VF-1 reaches zero, indicating that the power signal LPF-0 has been equal to or less than the power threshold PW multiplied by β for a certain length of time, the hangover timing circuit 600 begins measuring the time during which the power signal LPF-0 is equal to or less than the power threshold PW itself. When this time reaches a certain value, the hangover timing circuit 600 activtes a hangover reset signal RS-H that resets the voice detector 400.

While the falling-power count VF-1 is zero, if the power signal LPF-0 is equal to or less than the power threshold PW multiplied by a constant "b" (having a value of 0.5, for example) for a certain continuous length of time, the decrease in the power signal LPF-0 is deemed great enough to warrant and downward adjustment of the power threshold PW. The hangover timing circuit 600 accordingly multiplies the power threshold PW by a constant "d" (with a value of 0.9, for example) and supplies the resulting new power threshold PW*a to the power threshold circuit 320.

While the falling-power count VF-1 is zero, the hangover timing circuit 600 furthermore compares the power signal LPF-0 with the power threshold PW multiplied by the constant γ described above, and sends the supervisory circuit 500 a count restart signal VF-0 if the power signal LPF-0 exceeds the product, to initialize the falling-power count VF-1 as noted above.

Figure 6:
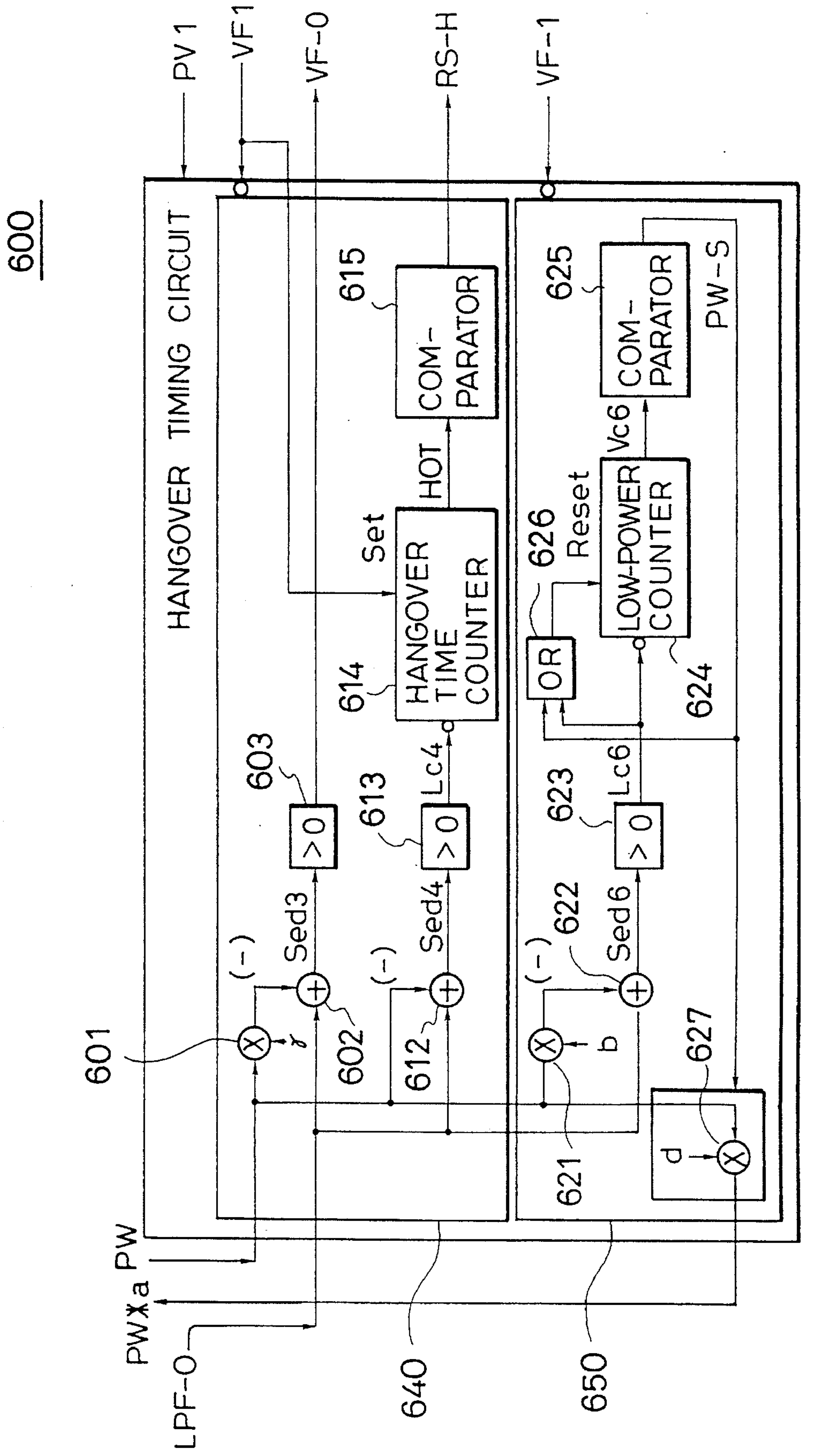
FIG. 6 is a block diagram illustratively showing an implementation of the hangover timing circuit in FIG. 5.

FIG. 6 shown an implementation of the hangover timing circuit 600, comprising two parts: a hangover counting circuit 640, and a threshold adjustment circuit 650. The hangover timing circuit 600 as a whole is activated when the voice detect signal PV1 is active. The hangover counting circuit 640 and threshold adjustment circuit 650 are activated individually when the falling-power count VF-1 is zero. The hangover counting circuit 640 comprises a multiplier 601, an adder 602, a comparator 603, another adder 612, another comparator 613, a hangover time counter 614, and a count comparator 615. The threshold adjustment circuit 650 comprises a multiplier 621, an adder 622, a comparator 623, a low-power counter 624, a count comparator 625, an OR gate 626, and a multiplier 627.

In the hangover counting circuit 640, the multiplier 601, adder 602, and comparator 603 carry out a multiply-subtract-compare operation. The multiplier 601 multiplies the power threshold PW by the constant γ, the adder 602 subtracts the result from the power signal LPF-0, and the comparator 603 compares the difference (Sed3) with zero. This operation generates the count restart signal VF-0, which becomes active when the power signal LPF-0 is greater than the power threshold PW multiplied by γ. The operation can be described in symbols as follows:

Sed3=LPF-0−(PW×γ)

VF-0 is high of Sed3>0, therefore

VF-0 is high if LPF-0>PW×γ

The adder 612 and comparator 613 carry out a subtract-and-compare operation. The adder 612 subtracts the power threshold PW from the power signal LPF-0. The comparator 613 compares the difference (Sed4) with zero. The output (Lc4) of the comparator 613 is high when the power signal LPF-0 is greater than the power threshold PW and low when the power signal LPF-0 is equal to or less than the power threshold PW.

Sed4=LPF-0−PW

Lc4 is high if Sed4>0, therefore

Lc4 is high if LPF-0>PW

The hangover time counter 614 generates a hangover time count HOT, which is set to a certain initial value by input of a positive falling-power count VF-1, and held at that value as long as the falling-power count VF-1 remains greater than zero. When the falling-power count VF-1 reaches zero, the hangover time counter 614 begins decrementing the hangover time count HOT by one each time the comparator 613 outputs a low comparison result Lc4, until the hangover time count HOT reaches zero. The count comparator 615 receives the hangover time count HOT and generates the hangover reset signal RS-H, which becomes active when the hangover time count HOT reaches zero.

In the threshold adjustment circuit 650, the multiplier 621, adder 622, and comparator 623 carry out a multiply-subtract-compare operation to determine whether the power signal LPF-0 exceeds the power threshold PW multiplied by the constant "b," as follows:

Sed6=LPF-0−(PW×b)

Lc6 is high if Sed6>0, therefore

Lc6 is high if LPF-0>PW×b

The low-power counter 624 counts the length of intervals during which the power signal LPF-0 is continuously equal to or less than the power threshold PW multiplied by "b."

Specifically, the low-power counter 624 is reset to zero each time Lc6 is high, and is incremented by one each time Lc6 is low, thereby generating a low-power count Vc6.

When the low-power count Vc6 reaches a certain value, the count comparator 625 outputs a power threshold update pulse PW-S. This pulse PW-S is routed via the OR gate 626 to reset the low-power counter 624, and also activates the multiplier 627, which then multiplies the power threshold PW by "d" to generate a new power threshold PW*a.

Figure 7:
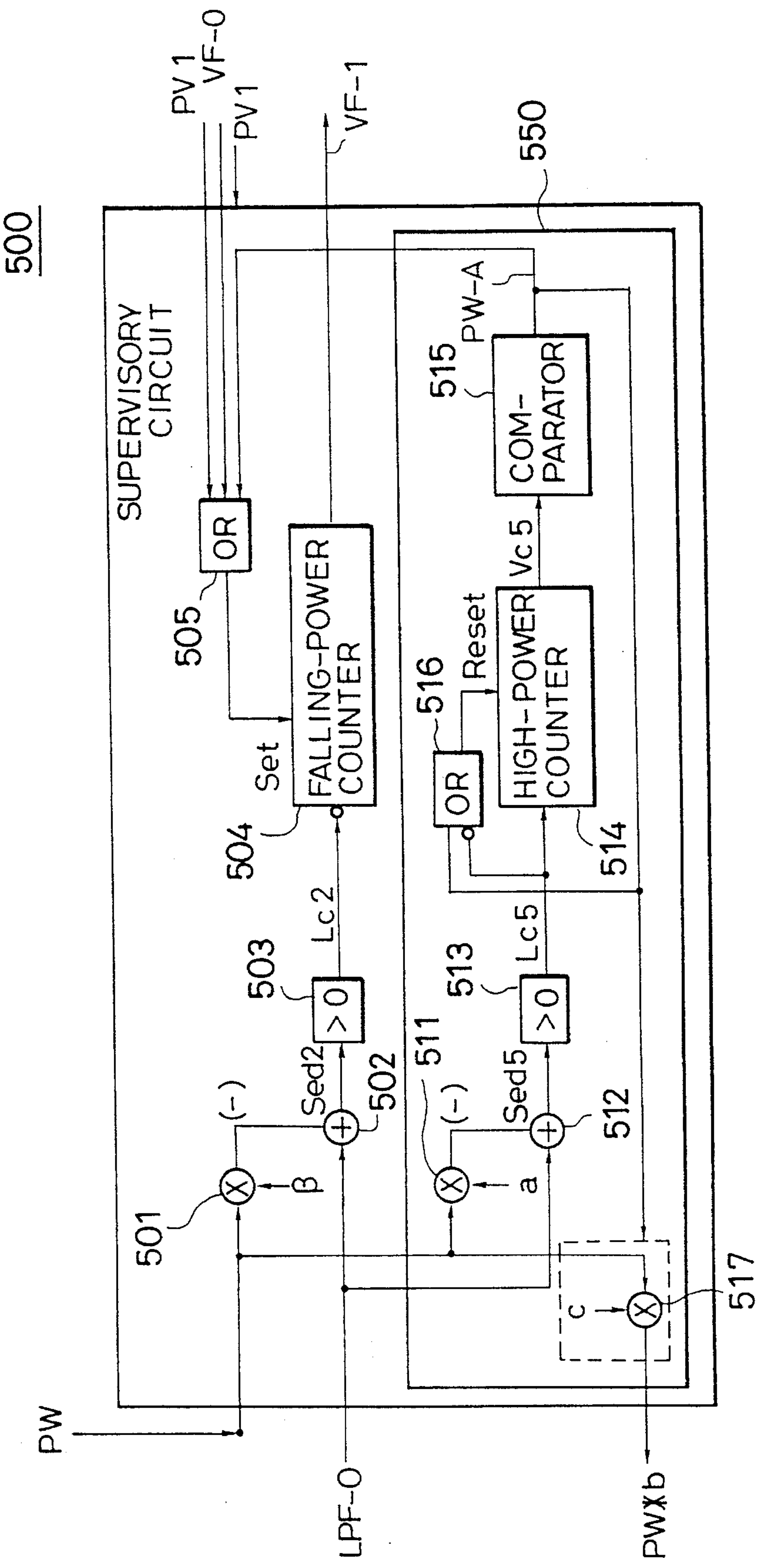
FIG. 7 is a block diagram illustratively showing an implementation of the supervisory circuit in FIG. 5.

FIG. 7 shows an implementation of the supervisory circuit 500, comprising a multiplier 501, an adder 502, a comparator 503, a falling-power counter 504, an OR gate 505, and a threshold adjustment circuit 550. The threshold adjustment circuit 550 comprises an adder 512, a comparator 513, a high power counter 514, a count comparator 515, and an OR gate 516.

The multiplier 501, adder 502, and comparator 503 carry out a multiply-subtract-compare operation to determine whether the power signal LPF-0 exceeds the power threshold PW multiplied by the constant β.

Sed2=LPF-0=(PW×β)

Lc2 is high if Sed2>0, therefore

Lc2 is high if LPF-0>PW×β

The falling-power counter 504 is set to a certain initial value by the voice detect signal Pv1 or the count restart signal VF-0, which are input via the OR gate 505, and is decremented by one each time the power signal LPF-0 is equal to or less than the power threshold PW multiplied by β. The count value generated by the falling-power counter 504 is output as the falling-power count VF-1.

In the threshold adjustment circuit 550, the multiplier 511, adder 512, and comparator 513 determine whether the power signal LPF-0 exceeds the power threshold PW multiplied by the constant "a."

Sed5–LPF-0–(PW×a)

Lc5 is high if Sed5>0, therefore

Lc5 is high if LPF-0>PW×a

The high-power counter 514 is reset when Lc5 is low and is incremented by one each time Lc5 is high. The high-power counter 514 thus counts the length of intervals during which the power signal LPF-0 continuously exceeds the power threshold PW multiplied by "a," generating a high-power count Vc5.

When the high-power count Vc5 reaches a certain value, the count comparator 515 outputs a power threshold update pulse PW-A. This pulse PW-A is routed via the OR gate 516 to reset the high-power counter 514, and also activates the multiplier 517, which then multiplies the power threshold PW by "c" to generate a new power threshold PW*b.

Figure 8:
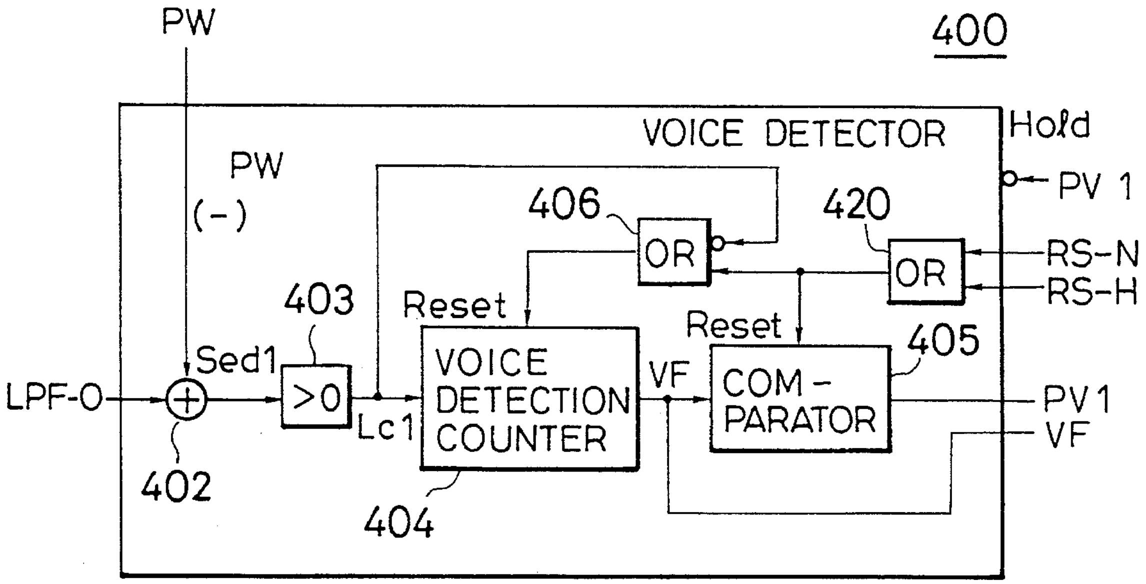
FIG. 8 is a block diagram illustratively showing an implementation of the voice detector in FIG. 5.

FIG. 8 shows an implementation of the voice detector 400, comprising an adder 402, a comparator 403, a voice detection counter 404, a voice count comparator 405, and OR gates 406 and 420.

The adder 402 and the comparator 403 compare the power signal LPF-0 with the power threshold PW.

Sed1=LPF-0–PW

Lc1 is high if Sed1>0, therefore

Lc1 is high if LPF-0>PW

The voice detection counter 404 is reset when Lc1 is low and is incremented by one each time Lc1 is high. The voice detection counter 404 thus counts the length of intervals during which the power signal LPF-0 continuously exceeds the power threshold PW. The count value output by the voice detection counter 404 is the voice count VF.

When the voice count VF reaches a certain value, the voice count comparator 405 activates the voice detect signal PV1. The voice detect signal PV1 is returned to the voice detector 400 as a hold signal. When the voice detect signal PV1 is active, the voice detector 400 as a whole suspends operation and holds its current state, including the active state of the voice detect signal PV1.

The steady-state reset signal RS-N and hangover reset signal RS-H are routed via the OR gates 406 and 420 to the voice detection counter 404 and the voice count comparator 405. Input of RS-N or RS-H resets the voice detection counter 404 and voice count comparator 405, resetting the voice count VF to zero and the voice detect signal PV1 to the inactive state.

Figure 9:
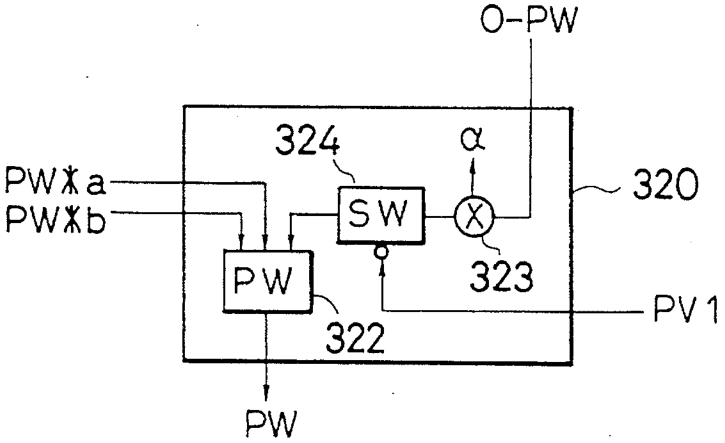
FIG. 9 is a block diagram illustratively showing an implementation of the power threshold circuit in FIG. 5.

FIG. 9 shows an implementation of the power threshold circuit 320, comprising a register 322, a multiplier 323, and a switch 324.

The register 322 holds the current value of the power threshold PW, which it supplies to other circuits. Whenever a new power threshold PW*a or PW*b is generated, this value is loaded into the register 322 to update the power threshold PW. During the time when voice is not detected (while the voice detect signal PV1 is inactive), the multiplier 323 multiplies the average power signal O-PW the constant α and supplies the product through the switch 324 to the register 322, so that the power threshold PW is kept continually equal to the latest value of the average power signal O-PW multiplied by α.

Figure 10:
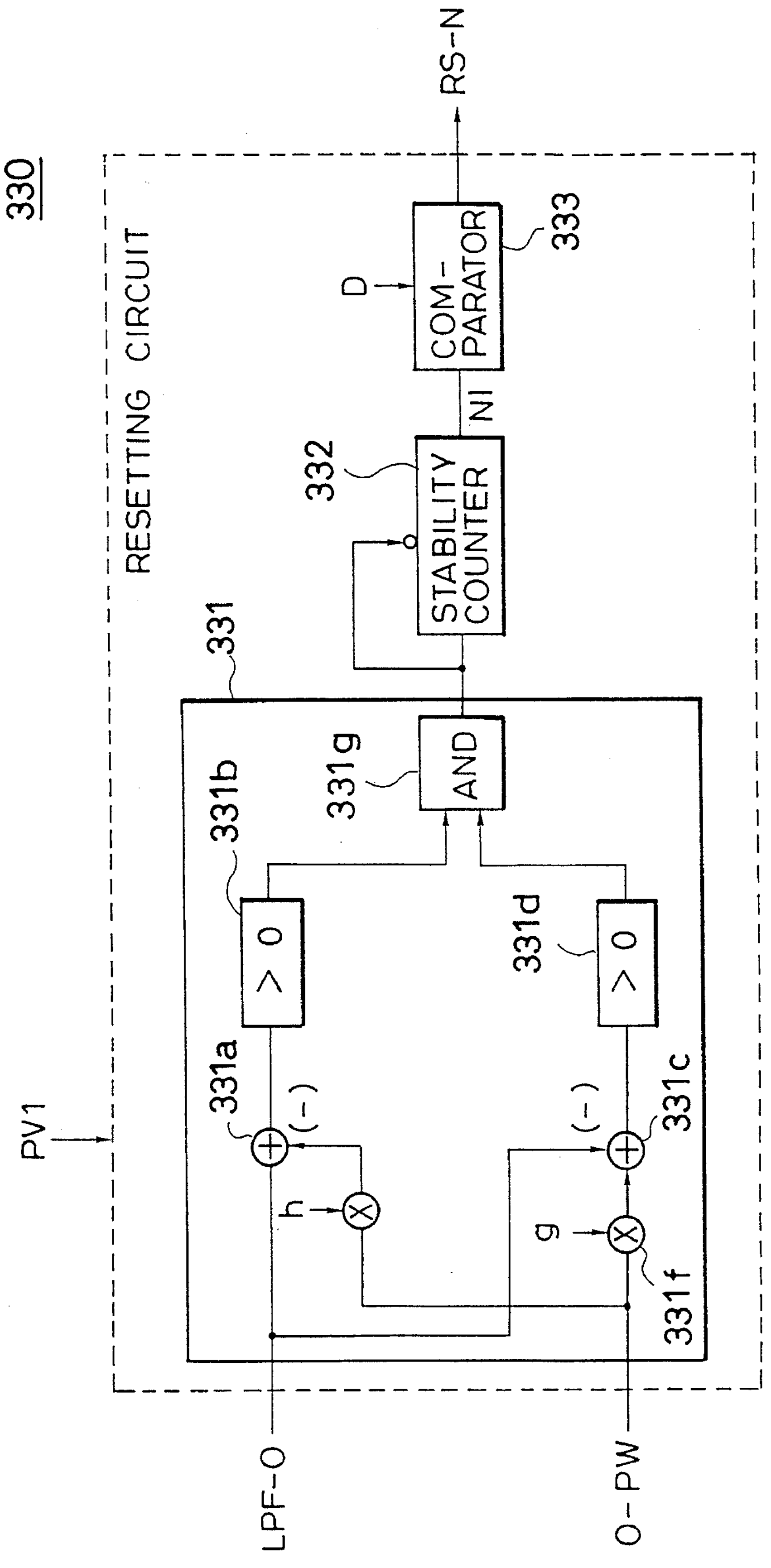
FIG. 10 is a block diagram illustratively showing an implementation of the resetting circuit in FIG. 5.

FIG. 10 shows an implementation of the resetting circuit 330, comprising a stability detector 331, a stability counter 332, and a count comparator 333. The stability detector 331 determines whether the power signal LPF-0 is disposed between the average power signal O-PW multiplied by the constants "g" and "h" mentioned above. The stability counter 332 counts the length of time the power signal LPF-0 is continuously disposed between these values, outputting a steady-state count NI. When this count NI reaches a certain value D, the count comparator 333 activates the steady-state reset signal RS-N.

The stability detector 331 comprises adders **331*a* and 331*c*, comparators 331*b* and 331*d*, multipliers 331*e* and 331*f*, and an AND gate 331*g*, which are interconnected as shown. The multiplier 331*e*, adder 331*a*, and comparator 331*b* perform a multiply-compare-subtract operation on the power signal LPF-0, the average power signal O-PW, and the constant "h." The multiplier 331*f*, adder 331*c*, and comparator 331*d* perform a multiply-compare-subtract operation on the power signal LPF-0, the average power signal O-PW, and the constant "g." The AND gate 331*g* takes the logical AND of the outputs of the comparators 331*b* and 331*d*. The stability counter 332 is reset when the output of the AND gate 331*g* is low, and is incremented each time the output of the AND gate 331*g*** is high.

Figure 11:
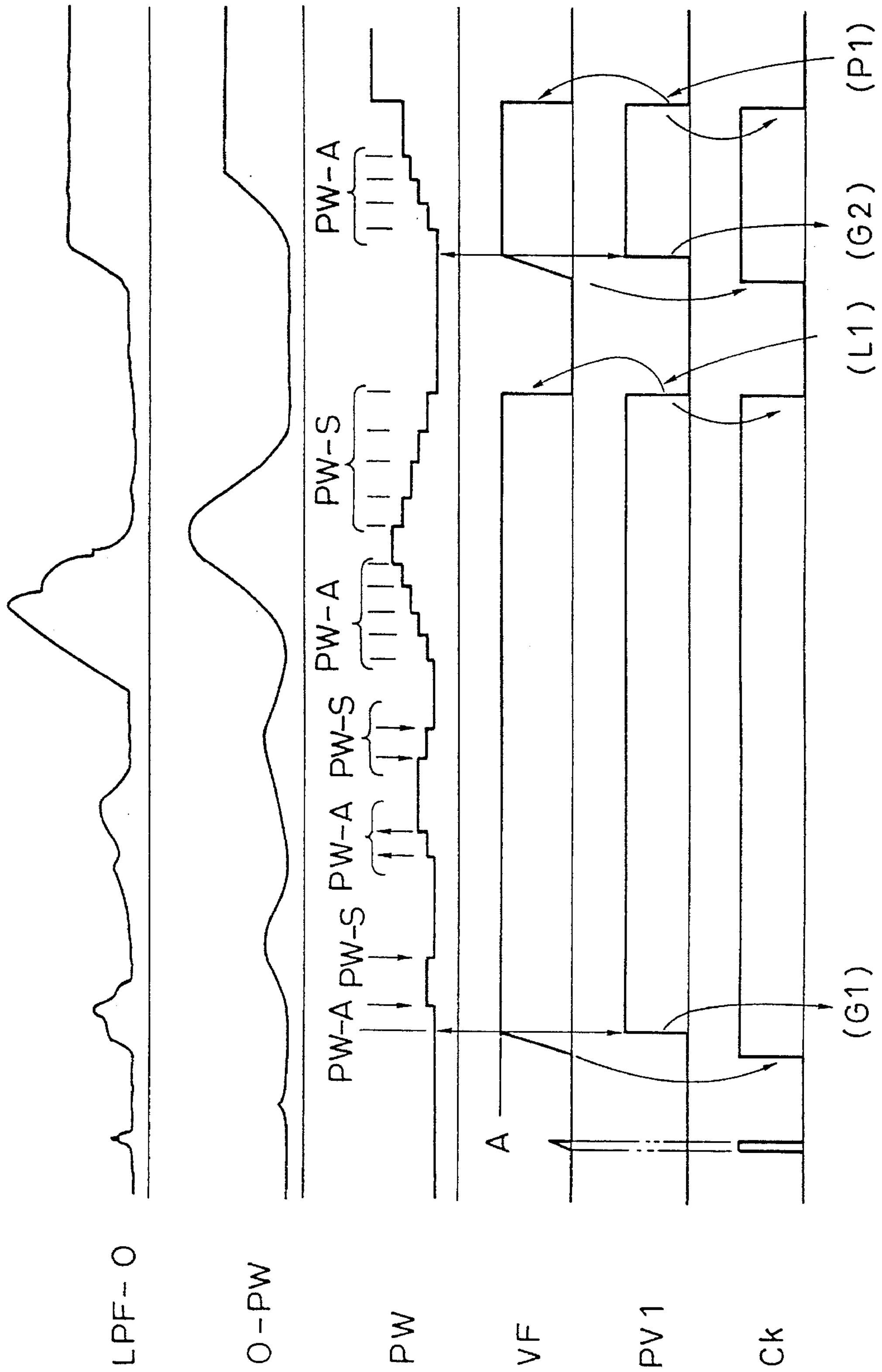
FIG. 11 is a timing diagram illustrating waveforms of the power monitoring circuit in FIG. 5.
Figure 12:
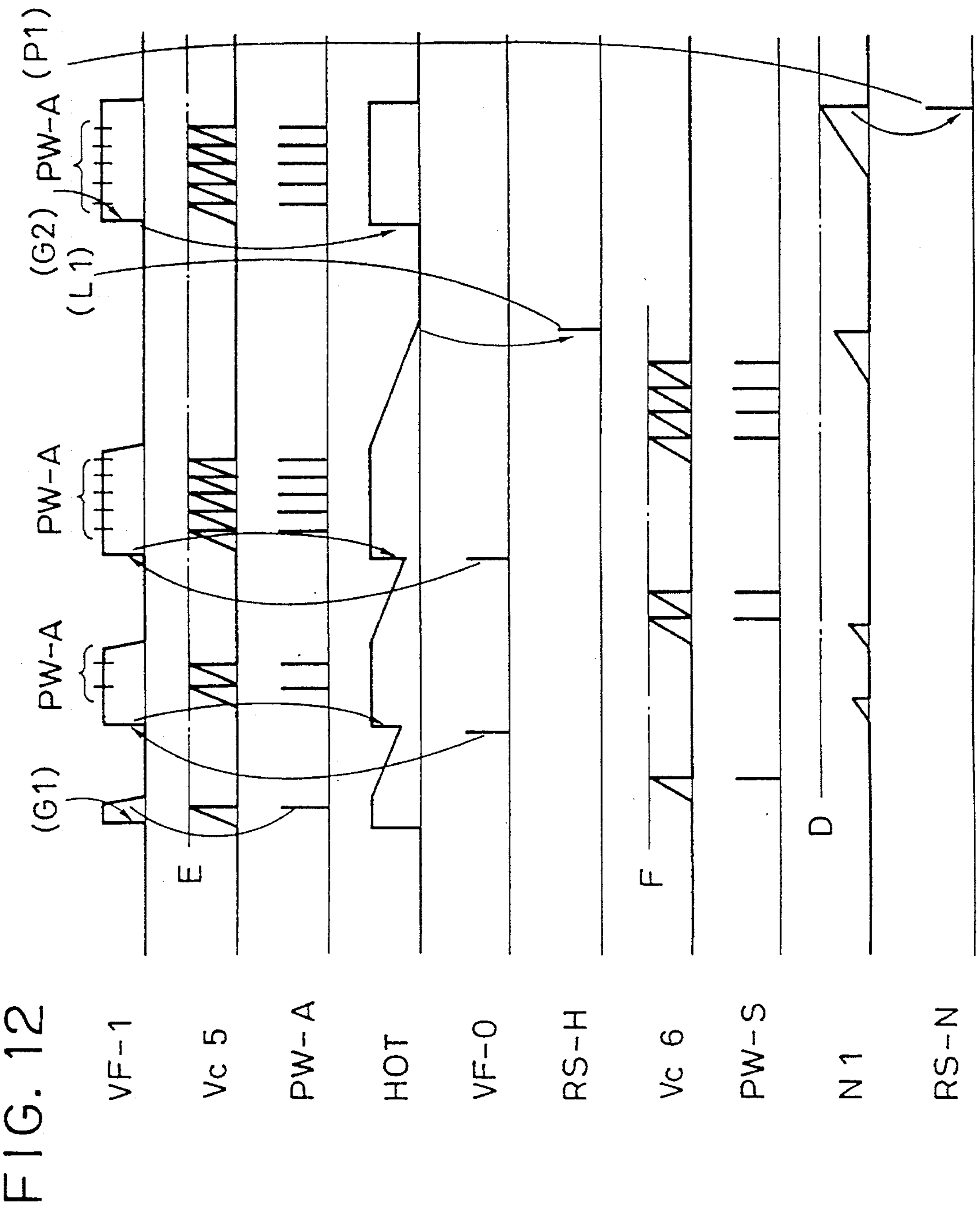
FIG. 12 is a timing diagram illustrating additional waveforms of the power monitoring circuit in FIG. 5.

Next the operation of this adaptive noise canceler will be described with reference to FIGS. 11 and 12. FIG. 11 shows waveforms of the power signal LPF-0, average power signal O-PW, power threshold PW, voice count VF, voice detect signal PV1, and control signal Ck. FIG. 12 shows waveforms of the falling-power count VF-1, high-power count Vc5, power threshold update pulse PW-A, hangover time count HOT, count restart signal VF-0, hangover reset signal RS-H, low-power count Vc6, power threshold update pulse PW-S, steady-state count NI, and steady-state reset signal RS-N.

Referring to FIG. 11, the power signal LPF-0 represents the power of the error signal Se output by the adder 10, averaged over short intervals to smooth out sample-to-sample variations. The long-term averaging circuit 310 averages the power signal LPF-0 over longer intervals, thus smoothing out small-scale irregularities in the power signal LPF-0, to generate the average power signal O-PW.

When speech is not detected (when the voice detect signal PV1 is low), the power threshold PW is set a fixed factor above the average power signal O-PW, being equal to the average power signal O-PW multiplied by a constant $\alpha$ greater than one. If the average power rises gradually or falls, the power threshold PW rises or falls in proportion. In this way the second embodiment adjusts automatically to gradual rises in the background noise level, as did the first embodiment.

When speech is detected (when the voice detect signal PV1 is high), the power threshold PW is generally held constant, but is increased or decreased in a series of steps if the power signal LPF-0 departs greatly from the power threshold PW for a certain time. If the power signal LPF-0 exceeds the power threshold PW continuously by a factor of "a" or more, a power threshold update pulse PW-A pulse occurs and the power threshold PW is adjusted upward by multiplying it by "c." If the power signal LPF-0 is continuously less than the power threshold PW by a factor of "b" or more, a power threshold update pulse PW-S pulse occurs and the power threshold PW is adjusted downward by multiplying it by "d." These upward and downward adjustments tend to keep the power level from being too far from the power threshold, thus preventing undue delays in the counting and other operations associated with hangover timing.

The voice count VF in FIG. 11 rises when the power signal LPF-0 exceeds the power threshold PW. If the voice count VF reaches a certain value A, voice is considered to be present and the voice detect signal PV1 is set high. The voice count VF remains constant of A as long as the voice detect signal PV1 remains high. If the power signal LPF-0 falls below the power threshold PW before the voice count VF reaches A, the voice count VF is reset to zero. (This constant A is unrelated to the adaptive threshold A in the first embodiment.)

The voice detect signal PV1 goes high when the voice count VF reaches A (at times G1 and G2), and remains high until reset by a hangover reset signal RS-H (at time L1) or a steady-state reset signal RS-N (at time P1). Voice detection at time G1 is followed by the type of unsteady fluctuations in the power signal LPF-0 associated with voice input. Voice detection at time G2 is followed by a rise to a new steady state, indicating that the rise in power was caused not by voice input but by a new background noise source.

The control signal Ck goes high whenever the voice detect signal PV1 is high or the voice count VF is greater than zero. The voice detect signal PV1 is therefore high not only throughout the intervals in which speech is detected, but also at times before these intervals, when the voice count VF is rising but has not yet reached A. While the control signal Ck is high, the filter coefficients in the adaptive filter 20 are not updated.

FIG. 12 illustrates the two ways in which voice detection intervals can end. One way is for the falling-power count VF-1 to fall to zero, then for the hangover time count HOT to fall to zero, causing the hangover reset signal RS-H to go high. If voice detection was due to actual voice input, as at time G1, this sequence of events occurs when the speaker stops talking, as the power signal LPF-0 first goes below the power threshold PW multiplied by $\beta$, then goes below PW itself, leading to an RS-H pulse at time L1.

After the falling-power count VF-1 has reached zero, if the power signal LPF-0 rises above PW multiplied by $\gamma$, the count restart signal VF-0 goes high, initializing the falling-power count VF-1, which in turn initializes the hangover time count HOT. This sequence of events occurs when the fall in power that caused the falling-power count VF-1 to reach zero was due, not to the cessation of voice input, but to a brief low-power episode in the voice input, as can occur, for example, when unvoiced consonants are pronounced. Sine the falling-power count VF-1 is now greater than zero, the hangover counting circuit 640 in the hangover timing circuit 600 is deactivated, so the count restart signal VF-0 immediately goes low again.

The other way in which a voice detection interval can end is for the power level to settle into a new steady state, allowing the steady-state count NI to reach the value D at which a the steady-state reset signal RS-N goes high, as at time L1. This occurs if voice detection was due to not to voice input but to an abrupt rise in background noise level, as at time G2. The steady-state count NI rises while the power signal LPF-0 is continuously between limits equal to the average power signal O-PW multiplied by "g" and "h," and is reset to zero whenever the power signal LPF-O goes outside these limits.

The high-power count Vc5 and power threshold update pulse PW-A control upward adjustments of the power threshold PW, which occur when the power signal LPF-O exceeds the power threshold PW multiplied by "a" continuously for a certain time, equivalent to a Vc5 count value of E. The low-power count Vc6 and power threshold update pulse PW-S control downward adjustments of the power threshold PW, which occur when the power signal LPF-O is equal to or less than the power threshold PW multiplied by "b" continuously for a certain time, equivalent to a Vc6 count value of F.

To summarize the operation of this adaptive noise canceler, the adaptive filter 20 attempts, by updating its filter coefficients, to minimize the power of the error signal Se. The power monitoring circuit 30 monitors the success of this attempt with reference to a threshold set equal to the long-term average of the power of the error signal Se multiplied by a constant ($\alpha$) greater than one. If the power of the error signal Se exceeds this threshold, updating of the filter coefficients immediately stops. If the power of the error signal Se returns below the threshold quickly, updating of the filter coefficients immediately resumes. If the power of the error signal Se remains above the threshold for a certain time, however, then before resuming the updating of filter coefficients, the adaptive noise canceler waits for the power either to die back, as determined by comparing the power with a series of values that allow a certain hangover time, or to settle into a steady state, as determined by comparing the power with certain range limits. While waiting for these conditions, the adaptive noise canceler updates the threshold in response to major changes in the power level.

When employed in a hands-free telephone in an automobile, the second embodiment operates generally like the first, but is more sensitive to voice input in a noisy environment. Voice input can be detected even under noisy conditions because the noise is canceled before voice detection takes place. This is an advantage of monitoring the error signal Se instead of the primary digital input signal Sa.

Another difference between the first and second embodiments is that the second embodiment does not stop updating its filter coefficients when noise from the same source increases in level. Such a noise increase does not cause the power of the error signal Se to increase significantly, because the noise component in the primary audio signal is strongly correlated with the noise component in the secondary audio signal, so the adaptive filter 20 can estimate the noise component accurately despite the change in the noise level. In this way the second embodiment avoids unnecessarily suspending the updating of filter coefficients.

Voice input in the primary audio signal is not strongly correlated with the secondary audio signal, so the presence of voice does cause the power of the error signal Se to increase, enabling the voice signal to be detected. The noise canceler then suspends adaptation and transmits the voice signal while continuing to cancel the background noise that was present before voice input began, as in the first embodiment.

Next a third embodiment will be described with reference to FIGS. 13 to 18. This embodiment monitors the power levels of both the primary digital input signal Sa and the error signal Se, and initializes the adaptive filter coefficients when the power of the primary digital input signal Sa is very low.

Figure 13:
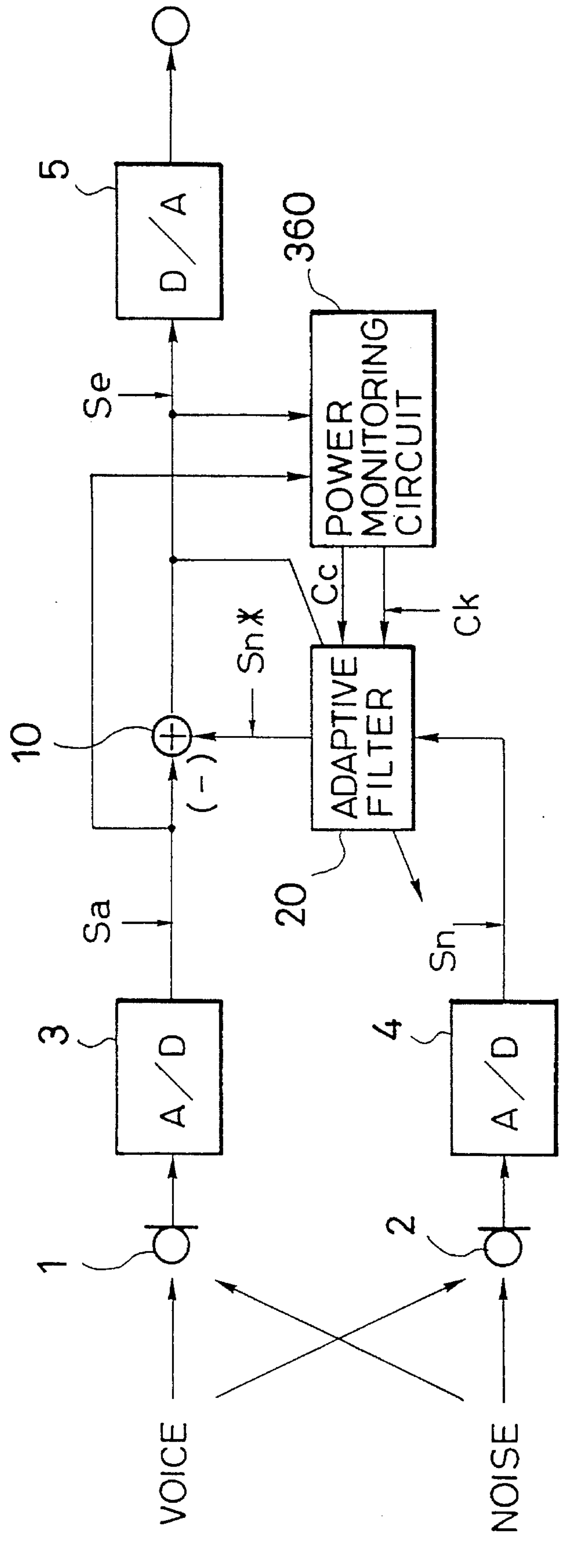
FIG. 13 is a block diagram of a third embodiment of the invention.

Referring to FIG. 13, the third embodiment employs the same microphones 1 and 2, A/D converters 3 and 4, D/A converter 5, adder 10, and adaptive filter 20 as the first and second embodiments. In place of the power monitoring circuit 30 of the first embodiment and the power monitoring circuit 300 of the second embodiment, however, the third embodiment has a power monitoring circuit 360 that receives the primary digital input signal Sa from the A/D converter 3 and the error signal Se from the adder 10, and generates two output signals: an initialization signal Cc and control signal Ck. As before, the control signal Ck prevents the adaptive filter 20 from updating its coefficients. The initialization signal Cc initializes the coefficients in the adaptive filter 20, by clearing them all to zero for example, so that noise canceling is not performed.

The power monitoring circuit 300 generates the control signal Ck by monitoring the power level of the error signal Se in the same way as in the second embodiment, and also by watching for increases in the power level of the primary digital input signal Sa. The initialization signal Cc becomes active, initializing the adaptive filter 20, when the power level of the primary digital input signal Sa stays below a certain threshold for a certain length of time.

Figure 14:
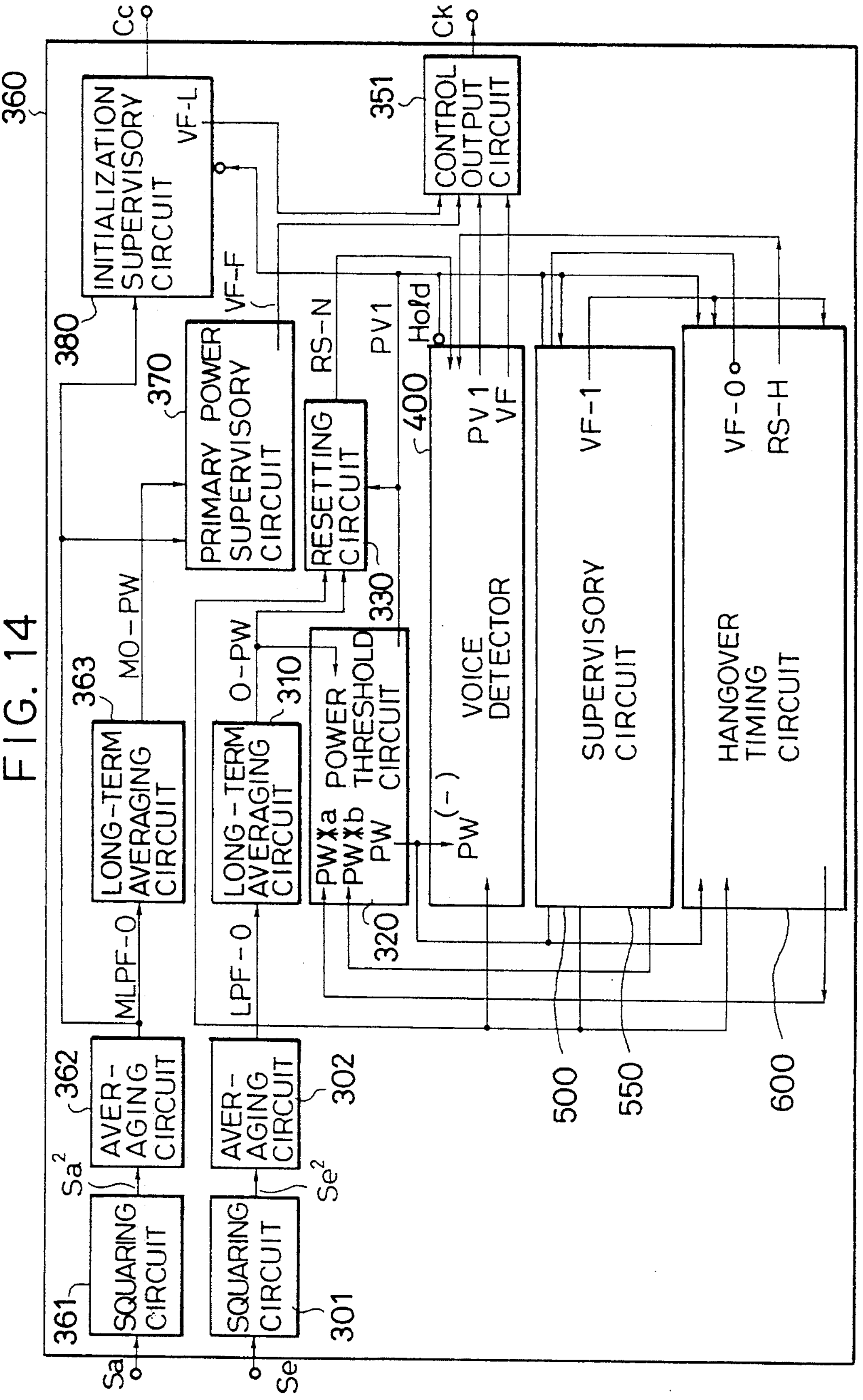
FIG. 14 is a more detailed block diagram of the power monitoring circuit in FIG. 13.

Referring to FIG. 14, the power monitoring circuit 360 comprises the same squaring circuit 301, averaging circuit 302, long-term averaging circuit 310, power threshold circuit 320, resetting circuit 330, voice detector 400, supervisory circuit 500, and hangover timing circuit 600 as in the power monitoring circuit 300 of the second embodiment. These components operate in the same way as in the second embodiment to generate the voice count VF and voice detect signal PV1. The power monitoring circuit 360 also comprises a squaring circuit 361, an averaging circuit 362, a long-term averaging circuit 363, a primary power supervisory circuit 370, an initialization supervisory circuit 380, and a control output circuit 351.

The squaring circuit 361, like the squaring circuit 31 of the first embodiment, receives the primary digital input signal Sa and raises it to the second power to generate a squared input signal $Sa^2$.

The averaging circuit 362 averages the squared input signal $Sa^2$ over intervals of a certain length to generate a primary power signal MLPF-O The long-term averaging circuit 363 stores the primary power signal MLPF-0 for a certain length of time and calculates the average value of part of the stored primary power signal MLPF-0 to generate an average primary power signal MO-PW.

The primary power supervisory circuit 370 compares the primary power signal MLPF-0, which it receives from the averaging circuit 362, with the average primary power signal MO-PW multiplied by a constant "f" (having a value of 1.4, for example), and generates a coefficient update control signal VF-F that is active (high) when the primary power signal MLPF-0 exceeds the average primary power signal MO-PW multiplied by "f."

The initialization supervisory circuit 380 compares the primary power signal MLPF-0, which it receives from the averaging circuit 362, with a fixed power threshold g1 (−50 dBm, for example) and generates a very-low-power count VF-L and the initialization signal Cc. The very-low-power count VF-L is a count signal indicating the length of time during which the primary power signal MLPF-0 is continuously less than the threshold g1. The initialization signal Cc becomes active when this length reaches a certain value.

The control output circuit 351 receives the voice detect signal PV1, voice count VF, coefficient update control signal VF-F, and very-low-power count VF-L, and generates the control signal Ck. The control signal Ck becomes active under any of the following four conditions (a) to (d):

| | |
|---|---|
| (a) VF-F is active: | MLPF-O > (MO-PW × f) |
| (b) VF-L is greater than zero: | MLPF-O < gl |
| (c) VF is greater than zero: | LPF-O > PW |
| (d) PV1 is active: | Speech is detected |

Figure 15:
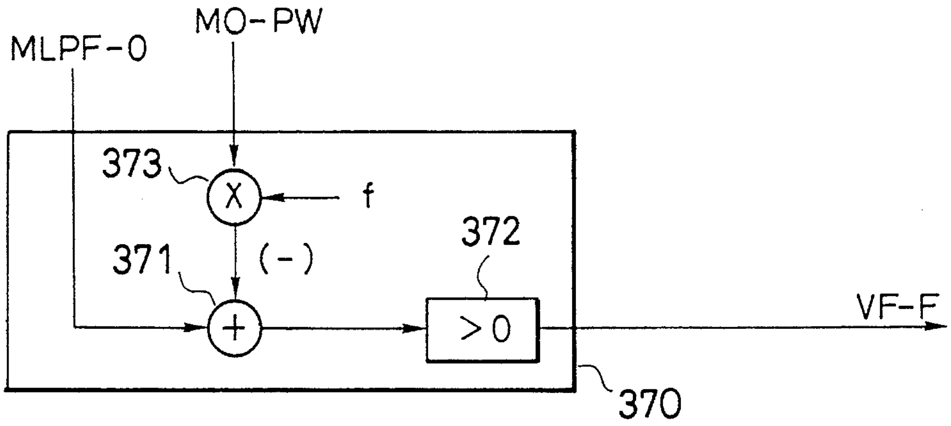
FIG. 15 is a block diagram illustratively showing an implementation of the primary power supervisory circuit in FIG. 14.

FIG. 15 shows an implementation of the primary power supervisory circuit 370, comprising an adder 371, a comparator 372, and a multiplier 373. These components carry out a multiply-subtract-compare operation to determine whether the primary power signal MLPF-0 exceeds the average primary power signal MO-PW multiplied by "f." The coefficient update control signal VF-F is output by the comparator 372, going high when MLPF-0>MO-PWxf.

Figure 16:
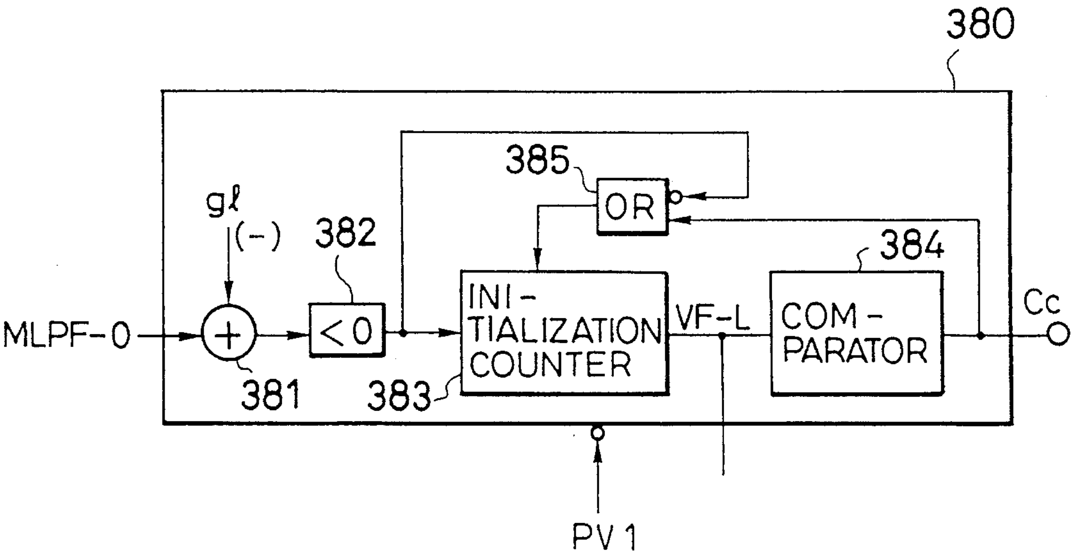
FIG. 16 is a block diagram illustratively showing an implementation of the initialization supervisory circuit in FIG. 14.

FIG. 16 shows an implementation of the initialization supervisory circuit 380, comprising an adder 381, a comparator 382, an initialization counter 383, a count comparator 384, and an OR gate 385. The adder 381 and comparator 382 compare the primary power signal MLPF-0 with the constant g1. When the primary power signal MLPF-0 is equal to or greater than g1, the initialization counter 383 is reset to zero. Each time the primary power signal MLPF-0 is less than g1, the initialization counter 383 is incremented by one. The output of the initialization counter 383 is the very-low-power count VF-L, which is supplied to the count comparator 384, as well as to the control output circuit 351. When the very-low-power count VF-L exceeds a certain value, the count comparator 384 activates the initialization signal Cc, clearing the adaptive filter coefficients. The initialization signal Cc is returned through the OR gate 385 to reset the initialization counter 383. Immediately after being activated, the initialization signal Cc therefore becomes inactive again.

Figure 17:
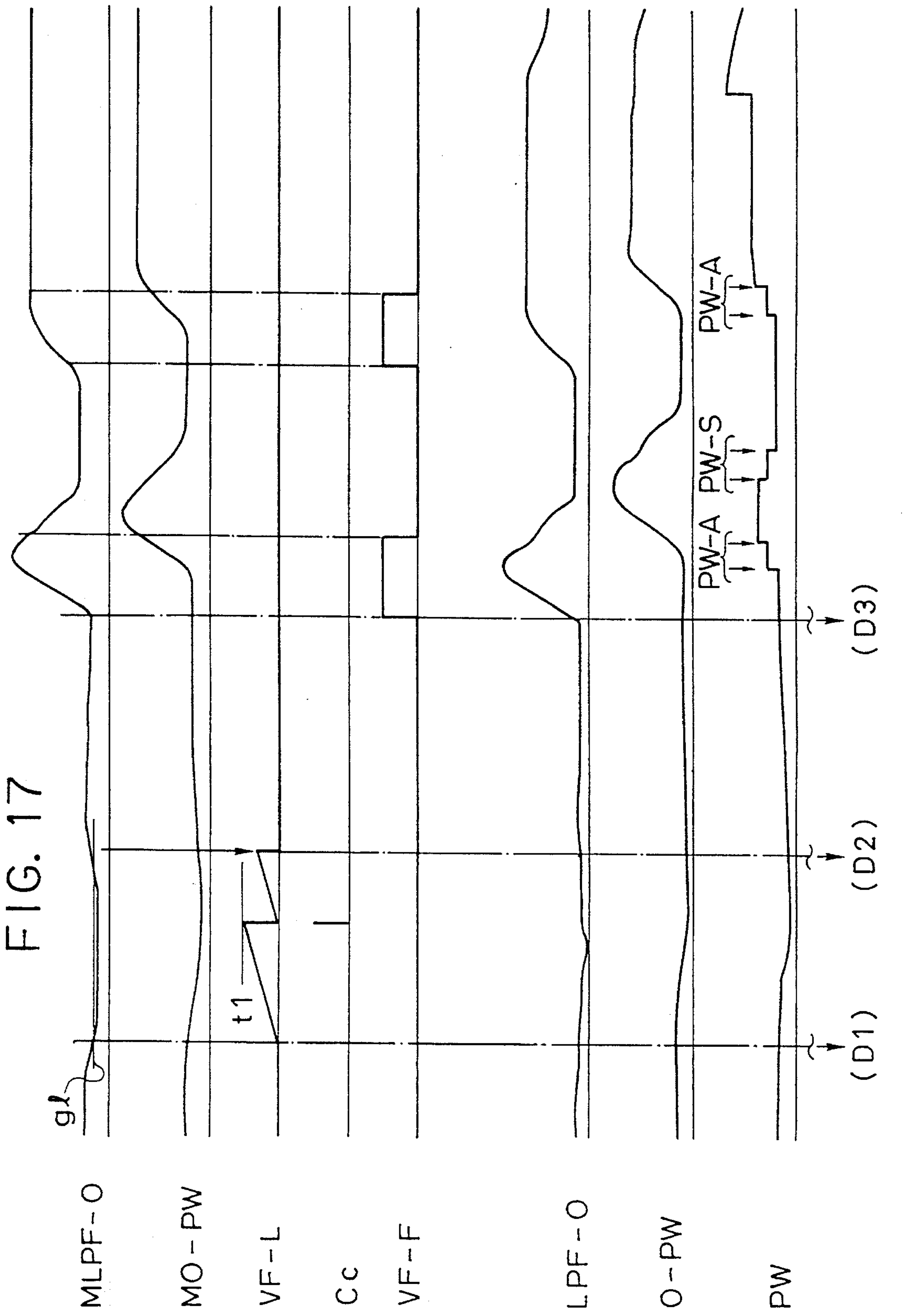
FIG. 17 is a timing diagram illustrating waveforms of the power monitoring circuit in FIG. 14.
Figure 18:
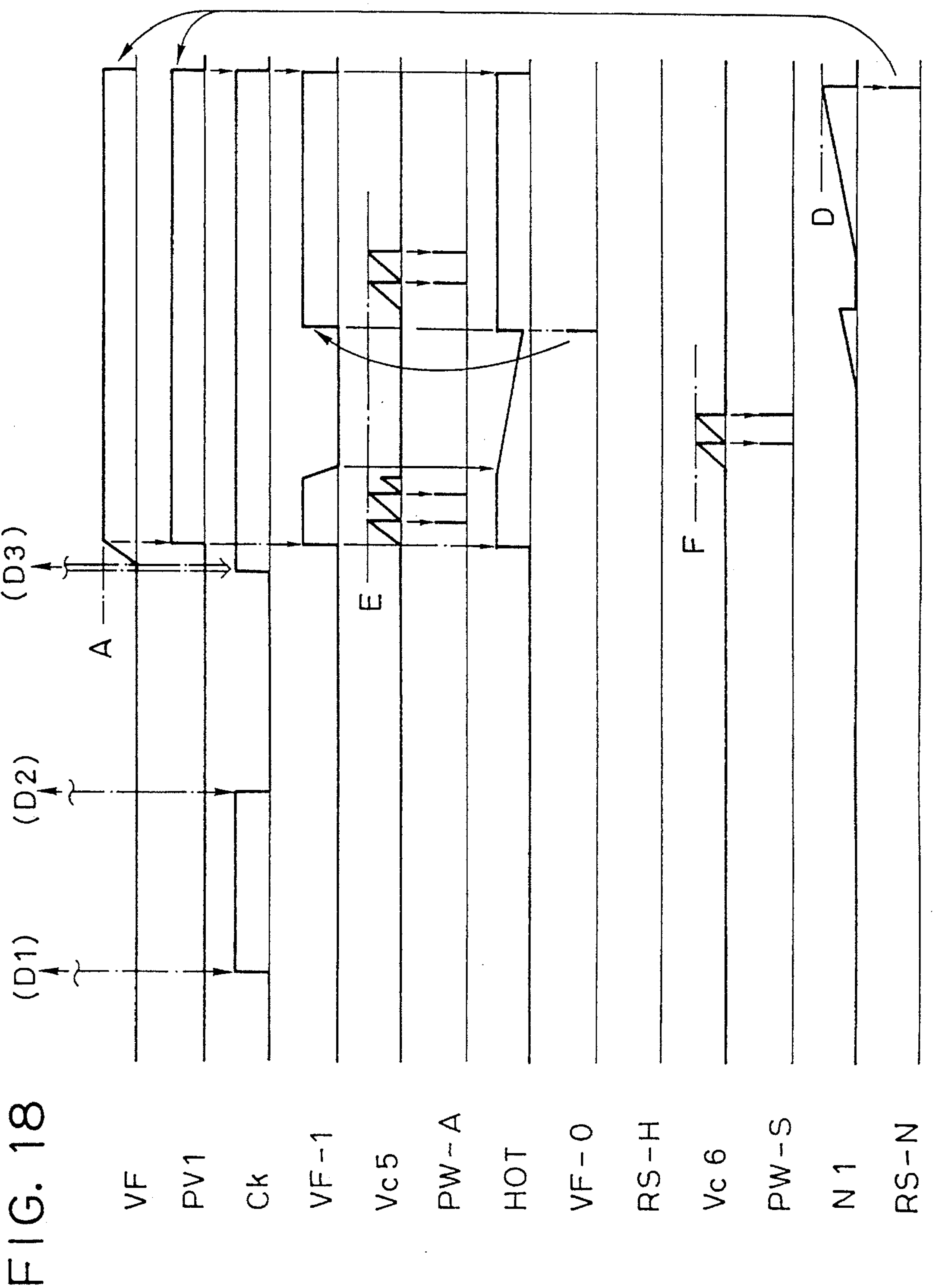
FIG. 18 is a timing diagram illustrating additional waveforms of the power monitoring circuit in FIG. 14.

Next the operation of the third embodiment will be described with reference to FIGS. 17 and 18. FIG. 17 shows waveforms of the primary power signal MLPF-0, the average primary power signal MO-PW, the very-low power count VF-L, the initialization signal Cc, the coefficient update control signal VF-F, the power signal LPF-0, the average power signal O-PW, and the power threshold PW. FIG. 18 shows waveforms of the voice count VF, the voice detect signal PV1, the control signal Ck, the falling-power count VF-1, the high-power count Vc5, the power threshold update pulse PW-A, the hangover time count HOT, the count restart signal VF-0, the hangover reset signal RS-H, the low-power count Vc6, the power threshold update pulse PW-S, the steady-state count NI, and the steady-state reset signal RS-N.

Referring to FIG. 17, the primary power signal MLPF-0 represents the power of the primary digital input signal Sa output by the A/D converter 3, averaged over short intervals to smooth out sample-to-sample variations. The long-term averaging circuit 363 averages MLPF-0 over longer intervals to produce the average primary power signal MO-PW.

During the interval from time D1 to time D2 when the primary power signal MLPF-0 is below the constant g1, the very-low-power count VF-L increases. Each time the very-low-power count VF-L reaches the value t1, as happens once in the D1–D2 interval, the initialization signal Cc goes high for a brief pulse, initializing the adaptive filter coefficients and resetting the very-low-power count VF-L. Noise canceling ceases from this point until time D2, but the noise level is so low that the power level of the error signal Se remains low anyway, as indicated by the signals LPF-0 and O-PW.

The coefficient update control signal VF-F goes high when the primary power signal MLPF-0 exceeds the average primary power signal MO-PW multiplied by "f." This occurs, for example, at time D3.

The power signal LPF-0 and average power signal O-PW have substantially the same waveforms as the primary power signal MLPF-0 and average primary power signal MO-PW, except that at the right edge of FIG. 17, the power signal LPF-0 and average power signal O-PW begin to decrease while the primary power signal MLPF-0 and average primary power signal MO-PW remain constant. This indicates that the adaptive noise canceler is adapting to a new steady-state noise source and is beginning to cancel the noise.

The power threshold PW follows variations in the average power signal O-PW during times when speech is not detected. After speech is detected, which occurs somewhat after time D3, the power threshold PW increases and decreases in steps triggered by pulses of the power threshold update pulse PW-A and power threshold update pulse PW-S, as described in the second embodiment. AT the right edge of FIG. 17 speech is no longer detected, and the power threshold PW again begins to follow the average power signal O-PW.

Referring to FIG. 18, the voice count VF begins to rise, indicating that the power LPF-0 of the error signal exceeds the power threshold PW, at a time slightly after D3. Voice is detected when voice count VF reaches the value A, driving the voice detect signal PV1 high.

The control signal Ck is high, disabling the updating of adaptive filter coefficients, throughout the interval from D1 to D2 while the very-low-power count VF-L in FIG. 17 is positive, and goes high again at time D3, when the coefficient update control signal VF-F in FIG. 17 goes high. The control signal Ck remains high while the voice count VF is rising and during the voice detection interval when the voice detect signal PV1 is high.

The rest of the signals in FIG. 18 operate as described in the second embodiment. Power threshold update pulses PW-A are generated when the high-power count Vc5 reaches E, and power threshold update pulse PW-S pulses when the low-power count Vc6 reaches F. The hangover time count HOT starts counting down when the falling-power count VF-1 reaches zero, but the falling-power count VF-1 and hangover time count HOT are reset by a count restart signal VF-0 before the hangover time count HOT reaches zero, so no hangover reset signal RS-H pulse is generated. When the steady-state count NI reaches D, indicating that the power signal LPF-0 is in a steady state, a steady-state reset signal RS-N is output, resetting all the signals in FIG. 18.

To summarize the operation of the third embodiment, when the power signal LPF-0 rises from a steady state and crosses the power threshold PW, updating of the adaptive filter coefficients is suspended as in the second embodiment. Updating of these coefficients is also suspended when the primary power signal MLPF-0 rises from a steady state, as indicated by comparing the primary power signal MLPF-0 with the average primary power signal MO-PW multiplied by "f." When the power level of the primary power signal MLPF-0 is comparatively low, as at time D3 in FIG. 17, the primary power signal MLPF-0 tends to cross its threshold (MO-PW×f) before the power signal LPF-0 crosses its threshold (PW=O-PW×α), so the third embodiment is able to react more quickly to the presence of voice than the second embodiment.

Updating of the coefficients is furthermore suspended when the primary power signal MLPF-0 falls below a fixed threshold g1, and if this state continues for a certain time, the coefficients are initialized so that no noise cancellation is performed. If a person starts speaking in this state, the coefficients remain initialized because the coefficient update control signal VF-F is high, or the voice count VF is positive, or the voice detect signal PV1 is high, or because of a combination of these conditions, so the person's voice is transmitted through the noise canceler without noise cancellation.

In a hands-free automobile telephone, the third embodiment operates like the second embodiment with two differences. The first is that noise canceling is disabled when the power level of the primary audio signal remains below the g1, as when the automobile is parked and the engine is off. In this condition these is little steady-state noise of any kind present in the primary audio signal, so a high signal-to-noise ratio can be anticipated when voice input begins. Disabling noise canceling in this condition creates a more realistic audio output signal.

The second difference is that by monitoring the power of the primary audio signal, when the power level of the primary audio signal is not below g1 but is still comparatively low, the third embodiment can react slightly more quickly to the presence of voice than can the second embodiment. This also enhances the quality of the audio output signal under generally quiet conditions.

The embodiments described above can be modified in further ways, including the following.

Figure 19:
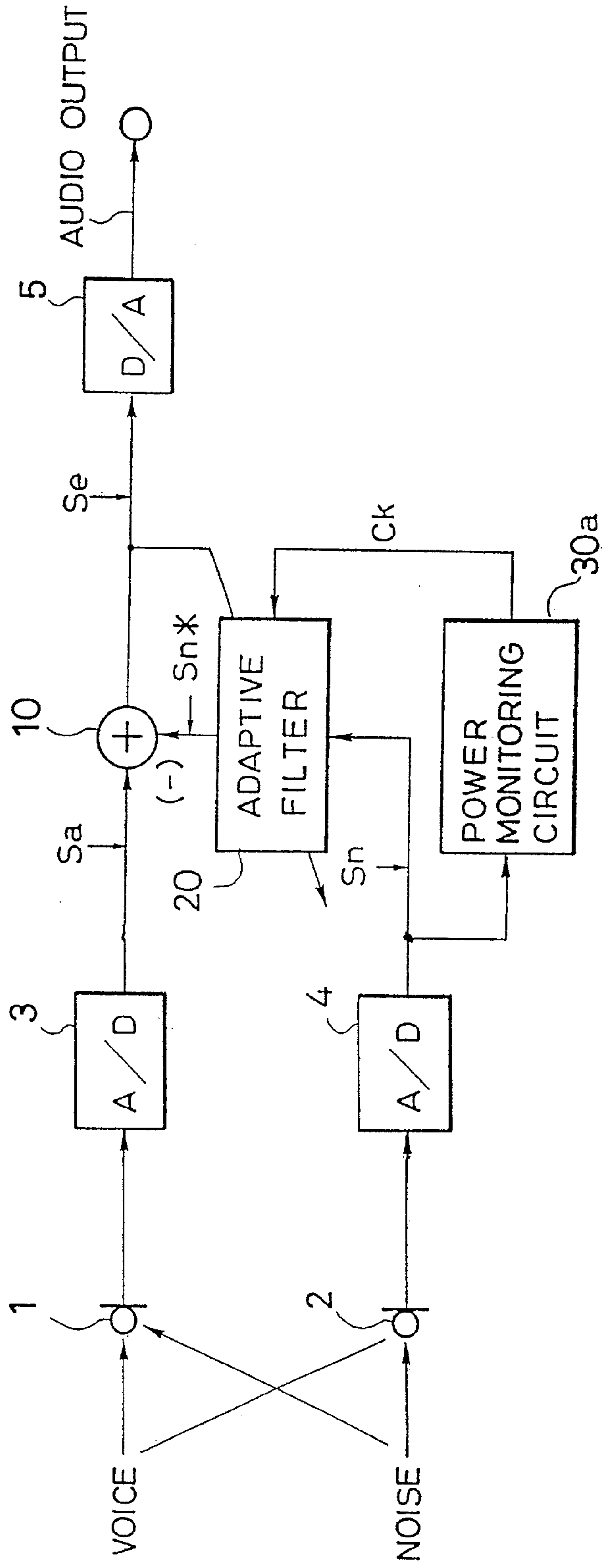
FIG. 19 is a block diagram of a modified embodiment of the invention.
Figure 20:
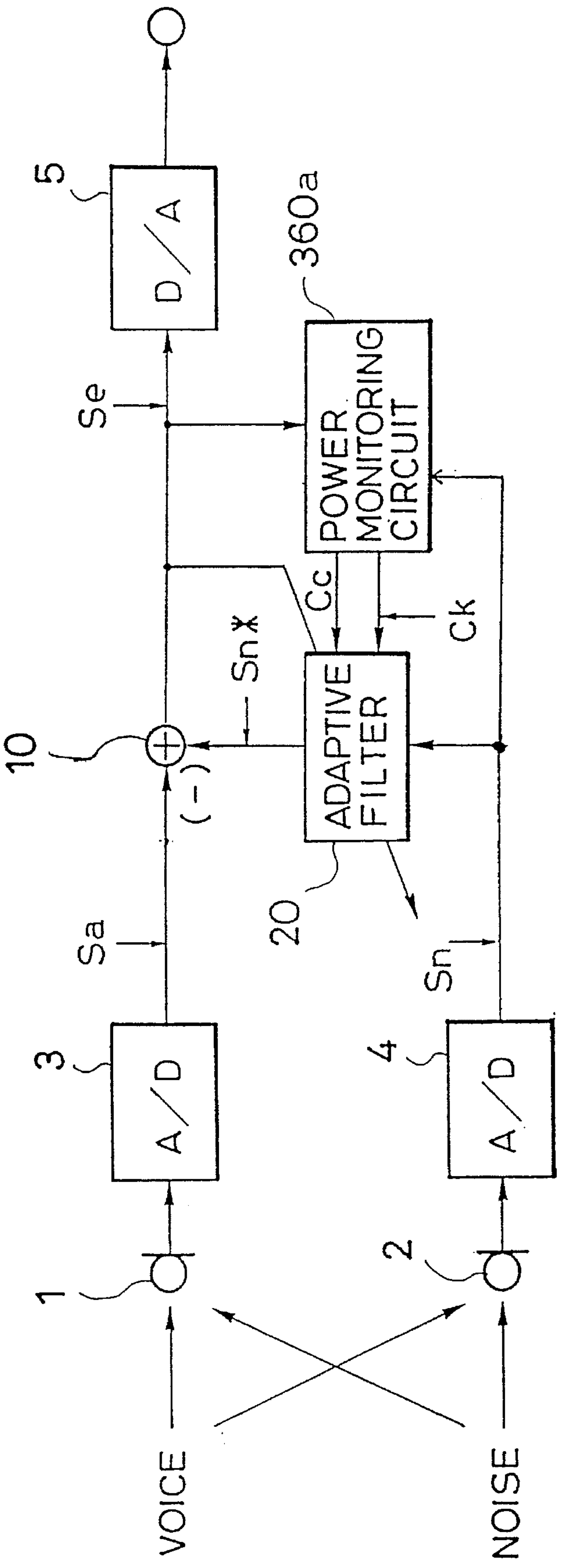
FIG. 20 is a block diagram of another modified embodiment of the invention.

The first and third embodiments can be modified by having the power monitoring circuit 30 or power monitoring circuit 360 monitor the power level of the secondary digital input signal Sn instead of the power level of the primary digital input signal Sa, as illustrated in FIG. 19 or FIG. 20. The circuits shown in FIGS. 2, 14, 15, and 16 can still be used for the power monitoring circuit *30a* and *360a* in FIGS. 19 and 20, with suitable modifications of threshold and constant values. Additional drawings will therefore be omitted.

In the first embodiment, two power monitoring circuits can be provided, one to monitor the power level of the primary digital input signal Sa, the other to monitor the power level of the secondary digital input signal Sn. Updating of the adaptive filter coefficients can be controlled by the outputs of both of these circuits, with different threshold values in each circuit. Similarly, in the third embodiment, it is possible to monitor the power of both the primary and secondary audio signals, as well as the power of the error signal Se, and control the updating and initialization of adaptive filter coefficients in response to the power of all three signals.

In the first embodiment, the averaging circuit 32 in the power monitoring circuit 30 need not average the squared input signal $Sa^2$ over fixed intervals of time. The averaging circuit 32 may be constructed so that the length of these intervals can be varied as necessary. The same modification may be made to the averaging circuit 302 in the second embodiment, or the averaging circuits 302 and 362 in the third embodiment.

The length of time over which the long-term power monitoring circuit 35 in the first embodiment calculated the long-term average of the power signal LPF-0 was described as several hundred milliseconds, but this is not a restriction. A different length may be used, or the long-term power monitoring circuit 35 may be constructed so that the length can be varied as necessary. The width of the steady-state margin C can also be made variable.

The duration T1 of the hangover time in the first embodiment was described as several milliseconds or several tens of milliseconds, but this is again not a restriction. A different duration may be used, or the hangover timer 36 may be constructed so that T1 can be varied as necessary.

Similar modifications can be made in the long-term averaging time and hangover time in the second and third embodiments. These times should be optimized according to the characteristics of the expected audio input signals.

The invention is not restricted to application in a hands-free automobile telephone. It is also applicable in the cockpit of an airplane, in factories, and in many other noisy environments. Nor is the invention restricted to the removal of background noise from voice signals; it can be applied to remove noise from other types of audio signals as well.

What is claimed is:

1. A method of using a secondary audio signal to cancel noise in a primary audio signal, comprising the steps of:

filtering said secondary audio signal according to a set of coefficients, thereby generating an estimated noise signal;

subtracting said estimated noise signal from said primary audio signal to generate an error signal for use as an audio output signal;

monitoring a power level of said error signal to generate a control signal;

when said power level exceeds a threshold which is updated according to said power level, making said control signal active to hold said coefficients constant; and when said power level does not exceed said threshold, making said control signal inactive to update said coefficients according to said error signal.

2. The method of claim 1, comprising the further steps of:

calculating a long-term average of the power level of said error signal;

multiplying said long-term average by a constant greater than unity to obtain a power threshold;

making said control signal inactive if the power level of said error signal is below said power threshold.

3. The method of claim 2, comprising the further step of:

making said control signal active if the power level of said error signal exceeds said power threshold.

4. The method of claim 1, comprising the further steps of:

calculating a long-term average of the power level of said error signal;

multiplying said long-term average by a constant greater than unity to obtain a power threshold;

making said control signal active if the power level of said error signal exceeds said power threshold;

making said control signal inactive if the power level of said error signal returns below said power threshold before a first length of time;

making said control signal inactive if the power level of said error signal returns below said power threshold after said first length of time and then is below said power threshold for a second length of time;

making said control signal inactive if the power level of said error signal settles into a new steady state; and updating said power threshold to a value responsive to said new steady state.

5. The method of claim 4, comprising the further steps of:

multiplying said power threshold by a constant greater than unity to obtain a first product;

raising said power threshold if the power level of said error signal remains above said first product for a certain length of time;

multiplying said power threshold by a constant less than unity to obtain a second product;

lowering said power threshold if the power level of said error signal remains equal to or less than said second product for a certain length of time.

6. The method of claim 1, comprising the further steps of:

monitoring a power level of said primary audio signal;

making said control signal active when the power level of said primary audio signal is below a certain fixed level; and initializing said coefficients if the power level of said primary audio signal remains below said fixed level for a certain time.

7. The method of claim 6, comprising the further steps of:

calculating a long-term average of the power level of said primary audio signal;

multiplying said long-term average by a constant value greater than unity; and making said control signal active if the power level of said primary audio signal exceeds the product of said long-term average and said constant value.

8. The method of claim 1, comprising the further steps of:

monitoring a power level of said secondary audio signal;

making said control signal active when the power level of said secondary audio signal is below a certain fixed level; and initializing said coefficients if the power level of said secondary audio signal remains below said fixed level for a certain time.

9. The method of claim 8, comprising the further steps of:

calculating a long-term average of the power level of said secondary audio signal;

multiplying said long-term average by a constant value greater than unity; and making said control signal active if the power level of said secondary audio signal exceeds the product of said long-term average and said constant value.

10. An adaptive noise canceler for using a secondary audio signal to remove noise from a primary audio signal, comprising:

a first A/D converter for converting said primary audio signal to a primary digital input signal;

a second A/D converter for converting said secondary audio signal to a secondary digital input signal;

an adder coupled to said first A/D converter, for subtracting an estimated noise signal from said primary digital input signal to produce an error signal;

a D/A converter coupled to said adder, for converting said error signal to an audio output signal;

an adaptive filter coupled to said second A/D converter, for convolving said secondary digital input signal with a set of coefficients to generate said estimated noise signal, and updating said coefficients responsive to said error signal; and a power monitoring circuit coupled to said adder, for monitoring a power level of said error signal, and commanding said adaptive filter to update said coefficients according to said error signal when said power level does not exceed a threshold which is updated according to said power level, and commanding said adaptive filter not to update said coefficients when said power level exceeds said threshold.

11. The noise canceler of claim 10, wherein said power monitoring circuit comprises:

a squaring circuit for squaring said error signal to generate a squared error signal;

an averaging circuit coupled to said squaring circuit, for averaging said squared error signal over intervals of a first length to generate a power signal;

a long-term averaging circuit coupled to said averaging circuit, for averaging said power signal over intervals of a second length longer than said first length, thereby generating an average power signal;

a power threshold circuit coupled to said long-term averaging circuit, for multiplying said average power signal by a constant greater than unity to generate a power threshold;

a voice detector coupled to said averaging circuit, for comparing said power signal with said power threshold to detect intervals in which said error signal has risen above said steady state; and a resetting circuit coupled to said long-term averaging circuit, for comparing said power signal with products of said averaging power signal and a pair of constants, comprising a constant greater than unity and a constant less than unity, to determine whether said error signal is in an unsteady state, and for resetting said voice detector when said error signal is not in an unsteady state.

12. The noise canceler of claim 11, further comprising a supervisory circuit coupled to said averaging circuit, for multiplying said power threshold by a constant greater than unity to generate a first product and raising said power threshold if said power signal exceeds said first product continuously for a certain time.

13. The noise canceler of claim 11, further comprising a hangover timing circuit coupled to said averaging circuit, for multiplying said power threshold by a constant less than unity to generate a second product, lowering said power threshold if said power signal is equal to or less than second product continuously for a certain time, comparing said power signal with said power threshold, and resetting said voice detector if said power signal is equal to or less than said power threshold for a certain time.

14. The noise canceler of claim 11, further comprising:

a second squaring circuit for squaring said primary digital input signal to generate a squared input signal;

a second averaging circuit coupled to said squaring circuit, for averaging said second squared input signal over intervals of a third length, thereby generating a primary power signal; and an initialization supervisory circuit coupled to said second averaging circuit, for comparing said primary power signal with a certain threshold level and initializing said coefficients in said adaptive filter if said primary power signal is equal to or less than said threshold level for a certain time.

15. The noise canceler of claim 14, further comprising:

a second long-term averaging circuit coupled to said second averaging circuit, for averaging said primary power signal over intervals of a fourth length longer than said third length, thereby generating an average primary power signal; and a primary power supervisory circuit coupled to said second long-term averaging circuit, for multiplying said average primary power signal by a constant greater than unity to generate a third product, and commanding said adaptive filter not to update said coefficients when said primary power signal is greater than said third product.

16. A method of using a secondary audio signal to cancel noise in a primary audio signal, comprising:

filtering said secondary audio signal according to a set of coefficients, thereby generating an estimated noise signal;

subtracting said estimated noise signal from said primary audio signal to generate an error signal for use as an audio output signal;

monitoring a power level of said primary audio signal to generate a control signal;

when said power level exceeds a threshold which is updated according to said power level, making said control signal active to hold said coefficients constant; and when said power level does not exceed said threshold, making said control signal inactive to update said coefficients according to said error signal.

17. The method of 16, further comprising:

comparing said power level to said threshold to update said threshold;

when said power level is less than said threshold, updating said threshold to a value exceeding said power level by a certain amount.

18. The method of claim 17, further comprising:

when said power level remains within a certain margin for at least a duration after the power level exceeded said threshold, starting updating said coefficients according to said error signal and updating said threshold to a value exceeding said power level by said certain amount.

19. A method of using a secondary audio signal to cancel noise in a primary audio signal, comprising:

filtering said secondary audio signal according to a set of coefficient, thereby generating an estimated noise signal;

subtracting said estimated noise signal from said primary audio signal to generate an error signal for use as an audio output signal;

monitoring a power level of said secondary audio signal to generate a control signal;

when said power level does not exceed a threshold which is updated according to said power level, making said control signal active to hold said coefficients constant; and when said power level exceeds said threshold, making said control signal inactive to update said coefficients according to said error signal.

20. The method of claim 19, further comprising:

comparing said power level to said threshold to update said threshold;

when said power level is less than said threshold, updating said threshold to a value exceeding said power level by a certain amount.

21. The method of claim 20, further comprising:

when said power level remains within a certain margin for at least a duration after the power level exceeded said threshold, starting updating said coefficients according to said error signal and updating said threshold to a value exceeding said power level by said certain amount.

22. An adaptive noise canceler for using a secondary audio signal to remove noise from a primary audio signal, comprising:

a first A/D converter for converting said primary audio signal to a primary digital input signal;

a second A/D converter for converting said secondary audio signal to a secondary digital input signal;

an adder coupled to said first A/D converter, for subtracting an estimated noise signal from said primary digital input signal to produce an error signal;

a D/A converter coupled to said adder, for converting said error signal to an audio output signal;

an adaptive filter coupled to said second A/D converter, for convolving said secondary digital input signal with a set of coefficients to generate said estimated noise signal and updating said coefficients responsive to said error signal; and a power monitoring circuit coupled to said first A/D converter, for monitoring a power level of said primary digital input signal, commanding said adaptive filter to update said coefficients according to said error signal when said power level does not exceed a threshold which is updated according to said power level, and commanding said adaptive filter not to update said coefficients when said power level exceeds said threshold.

23. The noise canceler of claim 22, wherein said power monitoring circuit compares said power level to said threshold to update said threshold, and when said power level is less than said threshold, updates said threshold to a value exceeding said power level by a certain amount.

24. The noise canceler of claim 23, wherein said power monitoring circuit both commands said adaptive filter to start updating said coefficients according to said error signal, and to update said threshold to a value exceeding said power level by said certain amount, when said power level remains within a certain margin for at least a duration after the power level exceeded said threshold.

25. An adaptive noise canceler for using a secondary audio signal to remove noise from a primary audio signal, comprising:

a first A/D converter for converting said primary audio signal to a primary digital input signal;

a second A/D converter for converting said secondary audio signal to a secondary digital input signal;

an adder coupled to said first A/D converter, for subtracting an estimated noise signal from said primary digital input signal to produce an error signal;

a D/A converter coupled to said adder, for converting said error signal to an audio output signal;

an adaptive filter coupled to said second A/D converter, for convolving said secondary digital input signal with a set of coefficients to generate said estimated noise signal, and updating said coefficients responsive to said error signal; and a power monitoring circuit coupled to said second A/D converter, for monitoring a power level of said secondary digital input signal, commanding said adaptive filter to update said coefficients according to said error signal when said power level does not exceed a threshold which is updated according to said power level, and commanding said adaptive filter not to update said coefficients when said power level exceeds said threshold.

26. The noise canceler of claim 25, wherein said power monitoring circuit compares said power level to said threshold to update said threshold, and when said power level is less than said threshold, updates said threshold to a value exceeding said power level by a certain amount.

27. The noise canceler of claim 26, wherein said power monitoring circuit both commands said adaptive filter to start updating said coffficients according to said error signal, and updates said threshold to a value exceeding said power level by said certain amount, when said power level remains within a certain margin for at least a duration after the power level exceeded said threshold.

* * * * *